(12) United States Patent
Hill

(10) Patent No.: US 7,480,206 B2
(45) Date of Patent: Jan. 20, 2009

(54) METHODS FOR EARTH MODELING AND SEISMIC IMAGING USING INTERACTIVE AND SELECTIVE UPDATING

(75) Inventor: N. Ross Hill, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/940,579

(22) Filed: Sep. 13, 2004

(65) Prior Publication Data

US 2006/0056272 A1    Mar. 16, 2006

(51) Int. Cl.
*G01V 1/34* (2006.01)
(52) U.S. Cl. .......................................... 367/73; 367/38
(58) Field of Classification Search ............. 367/72–73, 367/37–38, 61, 50–52; 702/16, 18
See application file for complete search history.

(56) References Cited

U.S. PATENT DOCUMENTS

| | | | | |
|---|---|---|---|---|
| 4,964,088 A | * | 10/1990 | Chittineni | 367/51 |
| 4,980,866 A | | 12/1990 | Wang et al. | |
| 5,173,880 A | * | 12/1992 | Duren et al. | 367/73 |
| 5,260,911 A | * | 11/1993 | Mason et al. | 367/57 |
| 5,265,068 A | * | 11/1993 | Wang et al. | 367/73 |
| 5,274,605 A | | 12/1993 | Hill | |
| 5,490,120 A | | 2/1996 | Li et al. | |
| 5,530,679 A | | 6/1996 | Albertin | |
| 5,555,531 A | | 9/1996 | Booth et al. | |
| 5,570,321 A | * | 10/1996 | Bernitsas | 367/38 |
| 5,629,904 A | | 5/1997 | Kosloff et al. | |
| 5,640,368 A | | 6/1997 | Krebs | |
| 5,870,691 A | | 2/1999 | Partyka et al. | |
| 6,081,482 A | * | 6/2000 | Bevc | 367/57 |
| 6,128,579 A | | 10/2000 | McCormack et al. | |
| 6,253,157 B1 | * | 6/2001 | Krebs | 702/18 |
| 6,424,920 B1 | * | 7/2002 | Osypov | 702/18 |

(Continued)

OTHER PUBLICATIONS

Alkhalifah, Tariq. "Gaussian beam depth migration for anisotropic media." Geophysics, vol. 60, No. 5 (Sep.-Oct. 1995).*

(Continued)

*Primary Examiner*—Jack W. Keith
*Assistant Examiner*—Scott A Hughes
(74) *Attorney, Agent, or Firm*—Christopher D. Northcutt; Richard J. Schulte

(57) ABSTRACT

A method for creating an enhanced seismic image is described. Seismic data is acquired from a seismic survey conducted over a subterranean region. The seismic data is transformed into energy components, preferably Gaussian beam components. An earth model is created which is comprised of lens elements. The set of energy components is propagated or migrated through the lens elements to form image components which are combined into a seismic image. A target is identified in the seismic image for image enhancement. Ray tracing may be used to select the trial set of lens elements to be updated and to select a subset of energy components. The subset of energy components is propagated through updated earth model to form updated image components. The seismic image is updated by replacing image components with updated image components which are formed from the subset of selected energy components. This subset is ideally greatly reduced in size relative to the overall number of energy components, i.e., beam components.

40 Claims, 11 Drawing Sheets

U.S. PATENT DOCUMENTS

| | | | | |
|---|---|---|---|---|
| 6,643,590 | B2* | 11/2003 | Wiggins | 702/16 |
| 2004/0022127 | A1* | 2/2004 | Faichney et al. | 367/73 |
| 2004/0162677 | A1* | 8/2004 | Bednar et al. | 702/14 |
| 2005/0088913 | A1* | 4/2005 | Lecomte | 367/51 |

OTHER PUBLICATIONS

Nowack, et al. "Gaussian beam migration for sparse common-shot common-receiver data." 73$^{rd}$ Annual SEG Int'l Meeting (Dallas, Tx) Oct.26-Oct. 31, 2003.*

Hill, "Prestack Gaussian-beam depth migration." Geophysics, vol. 66 (Jul.-Aug. 2001).*

Jacobs, et al, "Velocity model determination by the smart method—Part 2: application." 65th Annu Seg Int Mtg (Houston, Oct. 8-13, 1995.*

Gray, et al. "Imaging using multi-arrivals: Gaussian Beams or Multi-Arrival Kirchoff?" EAGE 65$^{th}$ Conference and Exhibition, Jun. 2003.*

Sun and Schuster, "3D wavepath migration." 2003 European Association of Geoscientists and Engineers.*

Gray, et al. "Nuts and bolts of beam migration." 2004 CSEG National Convention.*

N. Ross Hill, Gaussian Beam Migration, Geophysics, Vo. 55, No. 11 (Nov. 1990); pp. 1416-1428, 14 Figs.

Cerveny et al., Computation of Wave Fields in Inhomogeneous Media—Gaussian Beam Approach, Geophys. J. R. astr. Soc. (1982) 70, pp. 109-128.

Wapenaar et al., Inverse Extrapolation of Primary Seismic Waves, Geophysics, (Jul. 1989), pp. 853-863, vol. 54, No. 7, 8 Figs., 1989 Society of Exploration Geophysicists.

Alberto Da Costa et al., Gaussian Beam Migration, Annual Meeting Expanded Abstracts, Historical Series Disc 2, 1989-1991, Seismic Processing 3: Migration—Theory and Practice, SP 3.2, 1989, Dallas, Texas, pp. 1169-1171.

Kinneging et al., Efficient 2D and 3D Shot Record Redatuming, Geophysical Prospecting 37, 1989, pp. 493-530, GPPRAR37 (5) 455-588 (1989) ISSN 0016-8026, vol. 37, No. 5, 1989 Publication, European Association of Exploration Geophysicists.

Lazaratos et al., Radon Transform/Gaussian Beam Migration, Annual Meeting Expanded Abstracts, Historical Series Disc 2, 1989-1991, Seismic Migration: Migration Methods, SM3.8, 1990, San Francisco, California, pp. 1314-1317.

Hill, Gaussian Beam Migration, Geophysics, vol. 55, No. 11 (Nov. 1990), pp. 1416-1428, 14 Figs., 1990 Society of Exploration Geophysicists.

N.D. Whitmore, Iterative Depth Migration by Backward Time Propagation, SEG Expanded Abstracts 2, Seismic 10-Migration, 1983, p. 382, Amoco Production Co.

G.E. Murphy, N.D. Whitemore, and MA Thompson, Interactive Prestack Depth Migration, SEG Expanded Abstracts 12, p. 899, Amoco Production Co.

Alkhalifah, Tariq, Gaussian beam depth migration for anistrophic media, Geophysics, Sep.-Oct. 1995, pp. 1474-1784, vol. 80, No. 5, Society of Exploration Geophysicists.

Sheriff, Robert E., *Encyclopedic Dictionary of Applied Geophysics*, Fourth Ed., Society of Exploration Geophysicists, Tulsa, Oklahoma, 2002.

* cited by examiner

METHODS FOR EARTH MODELING AND SEISMIC IMAGING USING INTERACTIVE AND SELECTIVE UPDATING

FIELD OF THE INVENTION

The present invention relates generally to methods for earth modeling and seismic imaging, and more particularly, to methods which use beam migration to create seismic images.

BACKGROUND OF THE INVENTION

Constructing accurate seismic images and corresponding earth models is important in making decisions relating to exploration and reservoir management. For example, earth scientists use seismic images to determine where to place wells in subterranean regions containing hydrocarbon reservoirs. They also use velocity or earth models to create reservoir models suitable for reservoir fluid flow modeling. The quality of the decisions made by the earth scientists is highly dependent on the quality of the seismic images and earth models.

The quality of an earth model and the quality of a corresponding seismic image are interrelated. An earth model is typically comprised of hundreds of thousands or even millions of cells or elements which are used in a computer simulation. An imaging program is used which simulates energy passing through the elements of the earth model, constrained by seismic data, to create a seismic image. An accurate earth model is often necessary for a clear seismic image, and vice versa.

The earth model has various properties that will affect the computation of the seismic image. For example, a seismic velocity field is specified within each geologic layer in the earth model. The magnitude of the velocities and the spatial variations within the velocity field affect the positioning and focusing of energy propagation through the elements. Moreover, the shapes of the boundaries between various geologic layers can greatly affect the propagation direction of seismic energy as well. For example, an image beneath a massive salt formation is greatly affected by the shape of the boundaries between salt and sedimentary layers. Often, the velocities are not strongly dependent on the direction of energy propagation and are approximately specified as a simple isotropic scalar field. It is becoming common, however, to build much more detailed earth models which specify detailed anisotropic velocities with a tensor field.

The conventional practice for imaging complex geology is iterative refinement of both the earth model and the seismic image. FIG. 1 shows a flowchart outlining this conventional iterative process. A seismic survey is taken in step 20 of a subterranean region which is to be modeled and imaged. A geophysical/geological interpreter typically makes an initial determination of an appropriate earth model in step 30. This earth model is based upon information derived from well data, seismic surveys, geological outcrops, and geologic structural concepts. Commercially available programs are often used to construct such models. For example, GOCAD™ earth-modeling software is available from Earth Decision Sciences of Houston, Tex.

The earth modeling software creates an earth model data file that contains the particulars of the model. The time needed to prepare such a model depends on the size and complexity of model. Commonly, the time needed to prepare the initial model ranges on the order of 5 days to 5 weeks. The technical expertise required for creating an earth model is usually provided by collaboration between a person skilled in geology and another skilled in computer-aided design, especially of earth-model representations.

A seismic imaging expert, often a geophysicist, generates in step 40 images of the earth by using imaging software known in the seismic industry as migration software. An example of a migration program is ChevronTexaco's proprietary GBMig software. This software uses Gaussian beam migration to create seismic images. An example of a commercially available migration program is included in modules of ProMax® software sold by Landmark Graphics Corporation of Houston, Tex. These migration programs typically receive as input seismic data and an earth model data file created by the earth modeling software. The seismic imaging expert utilizes the earth model and seismic data to create seismic images which are saved as seismic image data files. The time required to create the initial seismic images is often on the order of 1 day to 4 weeks. Several different migration techniques may be used by the seismic imaging programs. Examples of these techniques include non-recursive Kirchhoff and Gaussian beam migration methods, recursive finite-difference and phase-shift-plus-interpolation methods.

Seismic interpretation software is used in step 50 to evaluate the seismic image and to compare the seismic images with the initial earth model. An example of such interpretation software is Seisworks® software available from Landmark Graphics Corporation, Houston, Tex. The technical skills for this evaluation and comparison include an understanding of structural geology and seismic stratigraphy. Several different factors are considered during the evaluation of the seismic image, including: (1) whether the earth model is consistent with the seismic image; (2) whether the seismic image is geologically plausible or even possible; and (3) whether the image is well-focused or is blurred.

After evaluation of the current seismic image, the earth model is refined in step 60 in hopes of reducing observed deficiencies in the image in a next round of imaging computations. A geophysical expert selects elements of the original earth model and revises these elements in an effort to improve the model. The updated model, containing the updated elements, is then saved as an updated earth model data file. The time necessary for this step is often several hours to several days.

The updated earth model data file is returned to the seismic imaging expert. The imaging expert supplies the updated earth model to the migration program to generate the next round of seismic images. This process takes approximately a day or even weeks, depending on the complexity of the earth model as it evolves. The updated seismic images are passed back to the geologic expert for reevaluation, and the iterative loop of steps 40-60, as seen in FIG. 1, continues until the seismic image is deemed satisfactory.

Many considerations affect the construction of the initial earth model. These considerations will vary depending on the type of geology being represented. For the example of sub-salt imaging in the Gulf of Mexico, an earth model is often constructed in a top-down fashion, as will now be described.

An "interpreter" is a person skilled in geologic interpretation and is often principally responsible for the development of an exploration prospect. The first step for the interpreter is typically to specify the ocean depths over the region of the recorded seismic data. These depths might be specified by the recorded bathometry, but more often the depths are mapped from a seismic image while working in a seismic interpretation system, such as Landmark's Seisworks® software. The initial seismic image used for identification of the water bottom can be constructed by very rudimentary imaging method since the travel paths to the water bottom are simple. Once the water bottom has been mapped, this map is saved as a computer data file and given to a geophysicist who is also skilled in computer-aided modeling of the earth. This geophysicist will form a two-layer model, the upper layer being the ocean, and the lower layer being a sedimentary layer. The velocities of the sedimentary layer are at this point only roughly specified by converting initial stacking velocities to interval velocities using a Dix conversion. The salt bodies are not yet represented in the model.

The current two-layer "sediments only" model is used as the earth model input to a depth migration imaging program, such as GBMig migration software which uses beam migration to create seismic images. The imaging program will produce an image of the sedimentary layers, but the image will not usually be well focused everywhere because the sedimentary velocities are not accurate and especially do not accurately represent lateral spatial velocity variations, such as might be caused by the presence of gas. The magnitude of the misfocusing is measured by the geophysicist and used as input to a tomography module, such as is included in Landmark's ProMax® software. This tomography program can estimate the corrections to the velocity field that are needed to correct the misfocusing in future applications of the imaging program. At this point, however, tomography is only appropriate for finding velocity corrections for regions above massive salt layers; the salt itself and regions below salt are generally too badly imaged to allow the use of tomographic velocity calculations.

Once the tomographic corrections have been calculated for the regions above the salt layers, these corrections are included in the earth model. The imaging program is again applied to the seismic data using the updated velocity or earth model. Since this updated model now has accurate velocities at least down to the top of salt layers, the computed energy propagation down to the top of salt should be accurate and result in an accurate image of the top of salt.

This latest image is again sent to the interpreter, whose job is now to map the top of salt. This round of mapping is not as easy as mapping the water bottom because the top of salt is often rugose. In fact, the mapping of the top of the salt is sometimes ambiguous, especially where the salt might be locally overturned or where sedimentary country rock might be entrained in the salt. Nevertheless, the top of salt is usually well imaged at this point because the propagation paths from the earth's surface to the top of salt are relatively simple.

The salt-top map is saved as a computer file and delivered to the geophysicist. The geophysicist enters this salt-top map into the earth model to form a three layered model, known as a "bottomless salt" model. The three layers are the water layer, the sedimentary layer above salt, and the salt layer. At this point, the salt layer extends to the bottom of the earth model. The actual bottom of salt is not yet specified because it is generally not yet well imaged. The seismic velocities within salt are usually modeled as a constant value that is representative of what is observed in wells that penetrate salt. The salt velocity value is also guided by values that were successfully used in other sub-salt imaging projects.

Now that the boundary specifying top of salt is included in the earth model, the imaging program can accurately compute the refraction of seismic energy at the top of salt and form an image to greater depths. In particular, the imaging program can now form an image of the salt bottom. The imaging program is run once again with the current "bottomless salt" model. The resulting image is again delivered to an interpreter, who must now map the bottom of salt.

The mapping of the bottom of salt is sometimes easy because the boundary is sometimes clearly imaged. Often, however, mapping the salt bottom is very difficult and ambiguous. The salt bottom is not well illuminated everywhere because the salt top refracts energy in other directions. There are often suture boundaries within the salt that might be mistaken for the salt bottom. Usually, the signal is weak because the salt top interface significantly reduces the energy transmitted to illuminate deeper horizons. There can also be large coherent noise caused by multiple reflections above the salt and by conversion of the pressure-wave seismic energy to shear-wave seismic energy. Although these factors make the identification of the salt bottom difficult, the interpreter must nevertheless map the salt bottom and save this map as a computer file.

The file containing the map of the salt bottom is delivered to the geophysicist, who uses this map to complete the specification of the shape of salt in the earth model. The geophysicist also specifies the velocities of sedimentary layers beneath the salt. It is difficult to measure sedimentary velocities beneath salt. Often, the velocity specification of sub-salt sediments is based on velocities measured in similar sedimentary layers that are at similar depth but are not beneath salt.

The imaging software is again applied to the seismic data, using the latest or velocity or earth model. Since the velocity model is complete, the quality of the resulting imaging is often sufficient for mapping sub-salt hydrocarbon prospects.

The sub-salt example just given illustrates a case with a step-by-step recipe for construction of the earth model. There is a clear-cut recipe because, in one important respect, this example earth model is simple: it has smoothly varying velocities within each layer. Only the boundaries between salt and sediments are complicated, and the shape of these boundaries often can be determined by the top-down recipe just described.

In many other cases, the construction of the velocity model is much more complicated and cannot be described beforehand in a step-by-step recipe. For example, in thrustbelt geology, there can be overturned layers for which it is difficult to determine both the layer shapes and the velocities within the layers. In other examples, anhydrates entrained in salt masses have a large effect on the propagation of the seismic energy but are difficult to map from the seismic image. Even for sub-salt imaging, the top-down recipe just described only results in a sub-optimal provisional earth model, which could be refined by further analysis.

There are many barriers to improving upon a suboptimal seismic image. First, it is often not clear what changes should be made to the model to improve the focusing of the image. Sophisticated tomographic inversion programs analyze the misfocus of a seismic image to derive model corrections to reduce this misfocus. Nevertheless, the resolution of these inversion programs is limited. Many different model corrections will produce the same degree of improvement of the image focus, although each different model will produce an image with different apparent geologic structure. Furthermore, in many seismic imaging problems, the seismic signal is weak and noise is strong, making it difficult to discern whether the image is focused or not.

Geophysical measurements are usually not sufficient for obtaining an accurate image of complex geology. Geologic considerations must constrain the image. There are many examples of these constraints. A simple geologic constraint would be that the image must agree with existing well data, which might include the positions and dips of bedding that appears in the image. Often, there is the geologic constraint that certain beds in the image should be simple and flat.

Another constraint is that fault-plane reflections should line up with the image of bedding throw. Moreover, an image that exhibits superimposed crossing geologic bedding cannot be correct. These are just a few simple considerations, but advanced structural principles also constrain the geology.

Combining geophysical inversion of the seismic data with geologic constraints on the earth model is difficult to derive mathematically and to implement in computer code. For example, the obvious constraint that geologic beds cannot cross is beyond the current technical art of tomographic seismic inversion. Only rudimentary constraints on the smoothness of the velocity field and reflection horizons are part of the current inversion art. Even smoothness constraints should not be imposed solely by the geologist or the geophysicist. A well-focused image that is consistent with a geologic framework should be the product of collaboration between geologic and geophysical experts.

Revising a seismic image with geologic insight is difficult. Besides days or weeks of computer time, revising an image requires coordination of an assembly-line process in which different specialists perform the steps using separate software applications in the process. Instead of constant collaboration, experts mostly interact only when intermediate results are transferred from one step to the next. FIG. 1 diagrams the geologic and geophysical evaluation of the image as different steps. The interpreter decides if the image is sufficient to map the geologic structure and, if it is not, points out the deficiency of the image to geophysical experts and asks them to improve the image. The interpreter generally does not get directly involved in the geophysical analysis.

Decisions on how best to update the earth models and seismic images and how to perform the seismic interpretation are generally not collaboratively made by all the experts. This is largely due to the length of time it takes to recompute updated data files, i.e., earth model data files, seismic image data files, and topological subsurface bedding maps. Commonly, it takes many hours or days for computers to compute these large updated files for each of the earth modeling, seismic imaging, and seismic interpretation steps. As a result, the earth modeling and seismic imaging iterative improvement is done in the discrete steps described above rather than in a fully collaborative fashion between experts from the various disciplines. All in all, this discretized process of creating the separate data files which are repeatedly passed back and forth between geologists, geophysicists and interpreters may take months before arriving at a satisfactory seismic image and corresponding earth model.

As described above, conventional methods of iteratively refining earth models and seismic images have a number of shortcomings. First, the computational efforts to update earth models, seismic images, and maps are great due to the recomputing of the entire data files during iterations. Second, because each of the updating steps in earth modeling, seismic imaging and seismic interpretation is so time consuming, it is difficult for and unlikely that the various experts will fully collaborate when decisions are made as how to update the earth model and seismic images. Finally, the passing of numerous data files back and forth between various experts and processing software require great efforts and care to insure the data files are not corrupted or lost during the enhancement process.

The present invention provides a time and computationally efficient method for interactively and selectively updating earth models and seismic images. As a consequence, collaboration between desired experts in geology, geophysics, seismic interpretation, and computer modeling can be used throughout the iterative process in updating the earth model and seismic images. This leads to better quality models and images being prepared in a relative short period of time, i.e., hours and days rather than days, weeks or even months. Further, ideally an integrated program is used in this iterative process which reduces chances for corrupting or losing data files used in the iterative enhancement process.

SUMMARY OF THE INVENTION

A method for creating an enhanced seismic image is described. Ideally, an earth model will concurrently be enhanced in quality. Seismic data are acquired from a seismic survey conducted over a subterranean region. The seismic data are transformed into energy components, preferably Gaussian beam components. An earth model is created which is comprised of lens elements having propagation properties, such as velocity and shape, which affect energy propagation through the lens elements. The energy components are propagated or migrated through the lens elements to form image components which are combined into a seismic image.

A portion or portions of the seismic image, referred to as a target(s), is identified in the seismic image for image enhancement. A trial set of lens elements is selected which may affect the imaging of the target when their propagation properties are altered. Ray tracing techniques are preferably used to select the trial set of lens elements. Propagation properties of the trial set of lens elements are then updated in an effort to enhance the seismic image.

A subset of energy components which may affect imaging of the target is selected. The subset of energy components are propagated through the updated earth model to form updated image components. The seismic image is updated by replacing image components in the current seismic image with corresponding updated image components which are formed from the propagated subset of selected energy components. The seismic image and earth model are iteratively updated until the seismic image is satisfactory.

Most preferably, the method for selecting the subset of energy components which is to be propagated through the updated lens element to form the updated image components is as follows. A trial set of energy components is selected from the transformed seismic data. The selection criteria is that an energy component have a corresponding ray path that passes within a predetermined distance of a target of interest. Furthermore, it is preferred that this ray path pass through at least one of the lens elements which is updated. Ideally, this trial subset of energy components is further reduced. Ray paths of the trial set of energy components are traced through the updated earth model to create updated ray paths. No image components need be formed at this time. Only those energy components who propagate and touch the target and also whose updated ray path passes through one of the updated lens elements is selected to be included in the subset of energy components which is to be used to form the updated image components. These updated image components will replace corresponding image component from the current seismic image to create an updated seismic image.

Ray tracing may be used to select the trial set of lens elements to be updated and also to select the trial set of energy components. The preferred energy components are Gaussian beam components and the preferred propagation or migration technique used is Gaussian beam migration. The iterative updating of the seismic image is performed within a single application so that data files do not have to be passed between separate software packages.

It is an object of the present invention to provide an integrated workflow in earth modeling and seismic imaging program wherein the computational time required to update earth models and seismic images is sufficiently short that this workflow can be accomplished interactively in minutes or hours rather than using discretized programs and analyses which require weeks or months to complete.

It is still another object to incrementally update depth migrated images by recomputing only those targeted image components associated with the latest changes in the earth model.

It is yet another object to provide an interpretation-depth migration scheme wherein select elements of a earth model are updated and only a subset of a corresponding portion of the seismic image need be updated in providing an enhanced seismic image.

Still a further object is to update an earth model using not only information from structural patterns emerging in the image but also by a quick ray-trace analysis of imaging focusing.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Figure 2:
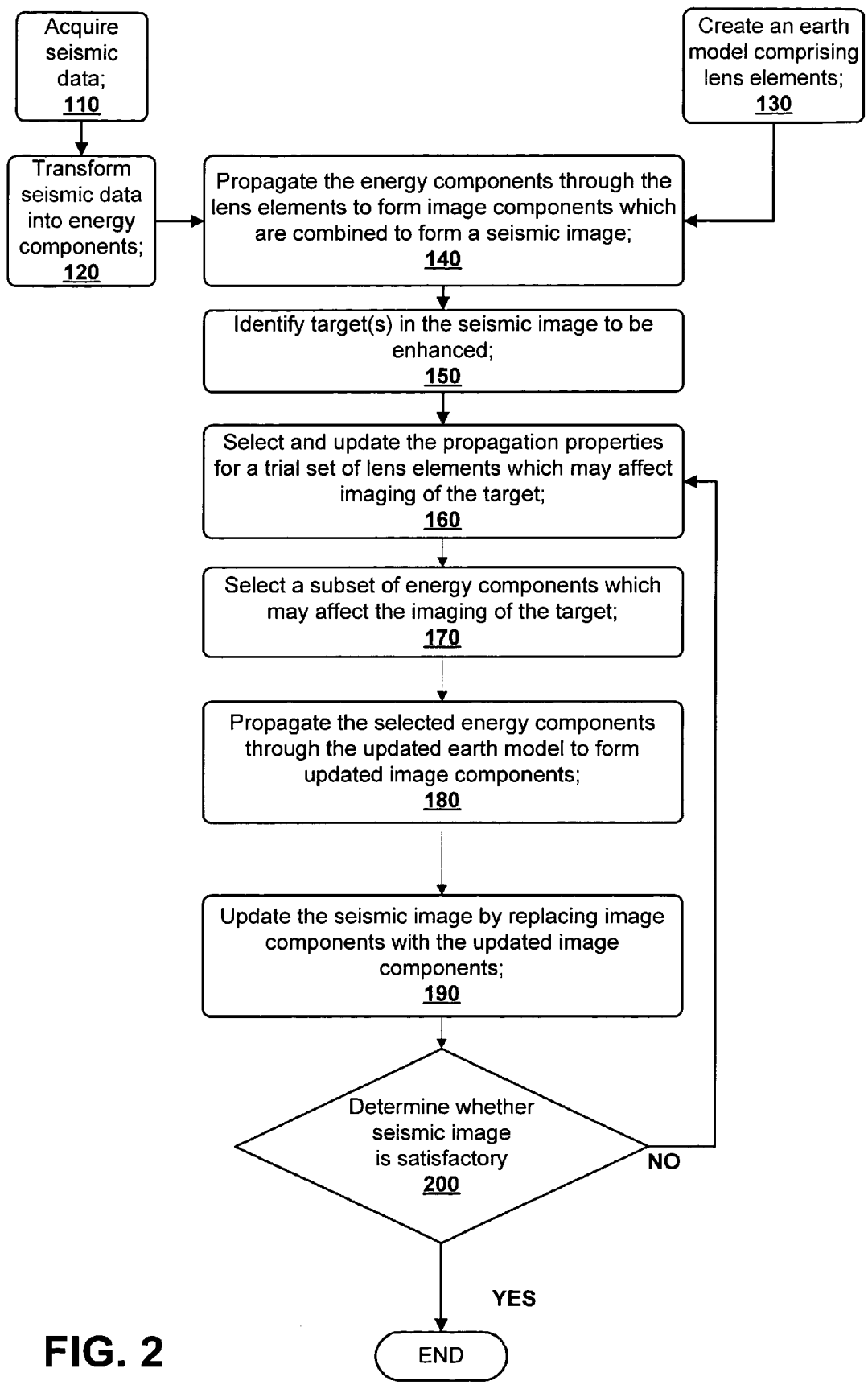
FIG. 2 is a flowchart of a preferred embodiment of the present invention showing a workflow for creating seismic images and earth models.
Figure 3:
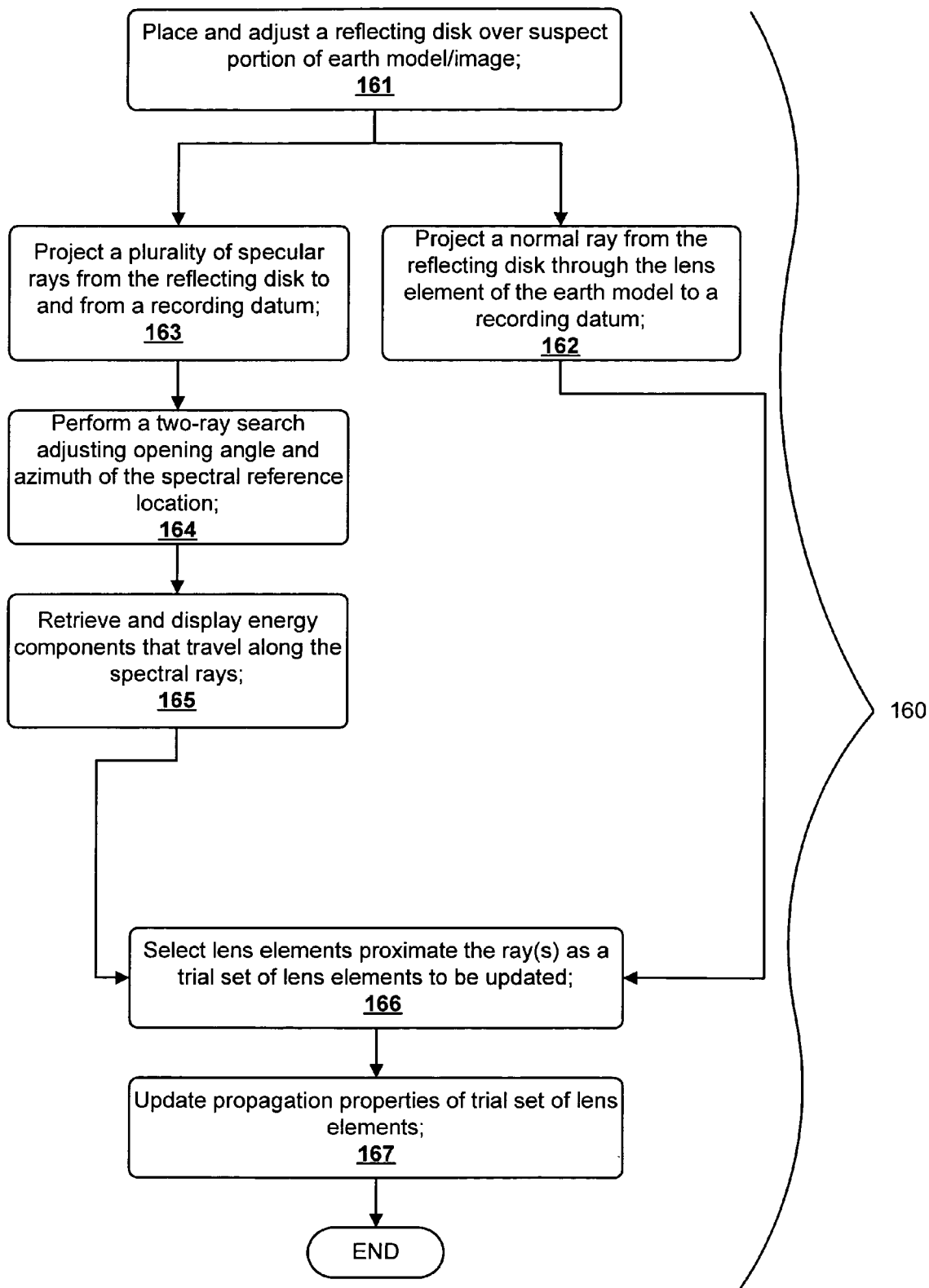
FIG. 3 is a flow chart describing ray tracing techniques which may be used to select lens elements which are to have their propagation properties, such as shape or velocity field, updated.
Figure 4:
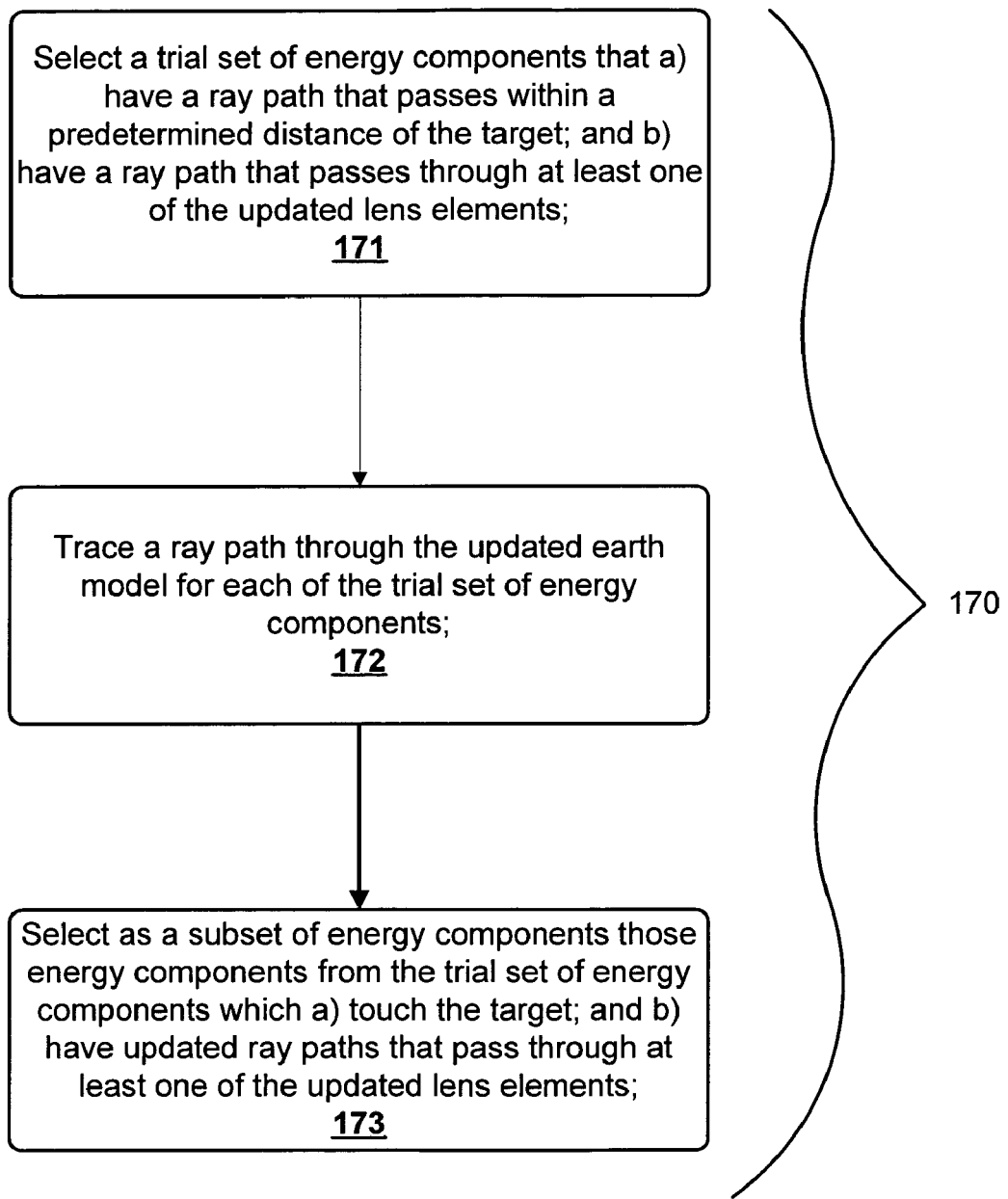
FIG. 4 shows preferred steps used to select a subset of energy components which are to be propagated through an updated earth model to form updated image components.

An exemplary and preferred embodiment of a method for creating an enhanced seismic image, made in accordance with the present invention, is shown in FIG. 2. FIGS. 3 and 4 show sub-steps of steps 160 and 170 of FIG. 2. The method concurrently optimizes an earth model along with the seismic image.

In step 110, seismic data are obtained from a seismic survey of a subterranean region of interest. The seismic data, if so desired, can be organized into data sets which facilitate further analysis. In this exemplary embodiment, the seismic data is organized into common-offset sections (COS). Alternatively, these seismic data may be used in a raw form by using the recorded organization of the seismic data, i.e., common shot gathers. Or else, the seismic data may be organized into other data sets such as common-midpoint gathers or common-receiver data.

Figure 5:
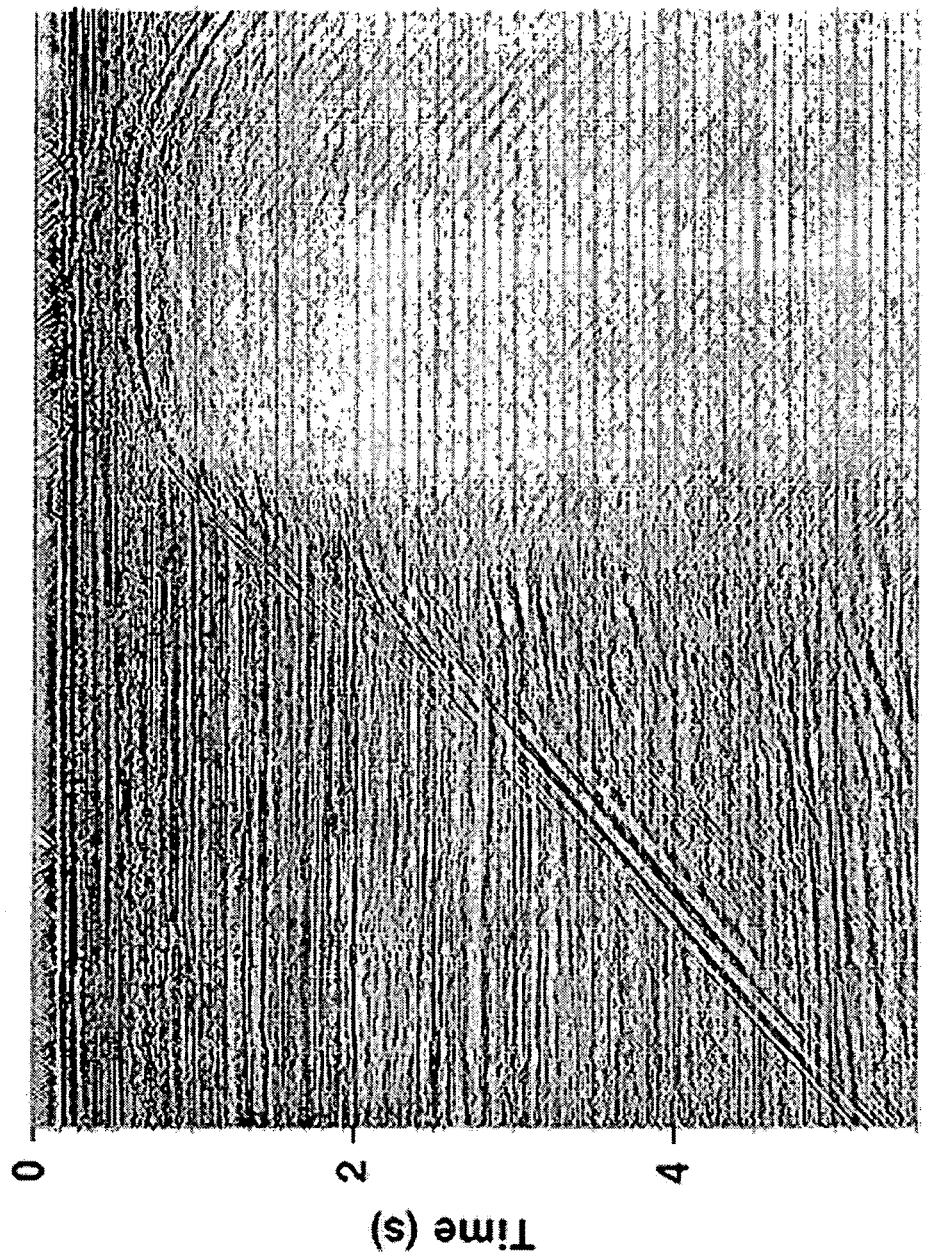
FIG. 5 illustrates seismic data processed into a Common-Offset Section or approximated to what would be recorded at zero offset.

FIG. 5 shows a two-dimensional example of a COS data set, which, for this particular example, happens to be for zero offset. Each COS data set includes only traces that were recorded at a particular offset vector. An offset vector is the spatial vector between the seismic source and the seismic detector for a trace. A trace at a particular offset vector might be available directly from a recorded data set. If this offset is not directly available, then the desired traces can be approximated by applying standard processing steps (such as moveout and stack) to traces recorded at some other offset vectors. Within each COS data set, the seismic traces are ordered into a three-dimensional array of values. The first axis of the three-dimensional array is the recorded time. The origin of the first axis is the initiation time of the seismic source. The other two axes are the X and Y spatial positions of the midpoint between the source and detector for each trace.

In step 120, these data sets are transformed into energy components. For the purposes of this specification, the term "energy components" refers to a set of components into which the recorded seismic data is analyzed or transformed. The energy components may include any partitioning of the seismic data including shot profiles, common offset data, common midpoint data and plane wave energy components.

In this preferred embodiment, the seismic data sets are transformed in energy components, referred to as beam components, and more preferably Gaussian beam components. In the case of beam components, the energy propagates approximately along a single ray path. Several physical energy sources, for example, air guns, contribute to each of the beam components traveling along their respective ray paths. By way of example and not limitation, other examples of energy components into which seismic data can be mathematically analyzed or decomposed include shot gathers or simple mathematical transformations such as plane-wave transforms (F-K transforms). In the case of shot gathers, the transformation can be considered to be simply an identity transform on the recorded data which results in the original shot gathers.

Each seismic data set, i.e., COS, is mathematically transformed in step 120 into a corresponding set of energy components, in this case Gaussian beam components. This transformation is ideally carried out as described in Hill, N. R., *Prestack Gaussian Beam Migration*, Geophysics, Volume 66, pp. 1240-50 (2001), and as will be further described in detail below.

Although not as preferred, the transformation into beam components could also be performed in accordance with the transformation method described in U.S. Pat. No. 5,274,605, entitled "Depth Migration Method Using Gaussian Beams", the teachings of which are hereby incorporated by reference in its entirety. A further transformation method is also described in Hill, N. R., *Gaussian Beam Migration*, Geophysics, Volume 55, pp. 1416-28, (1990). Both of the aforementioned publications to N. R. Hill are also incorporated herein by reference for their descriptions regarding Gaussian beams.

Figure 6:
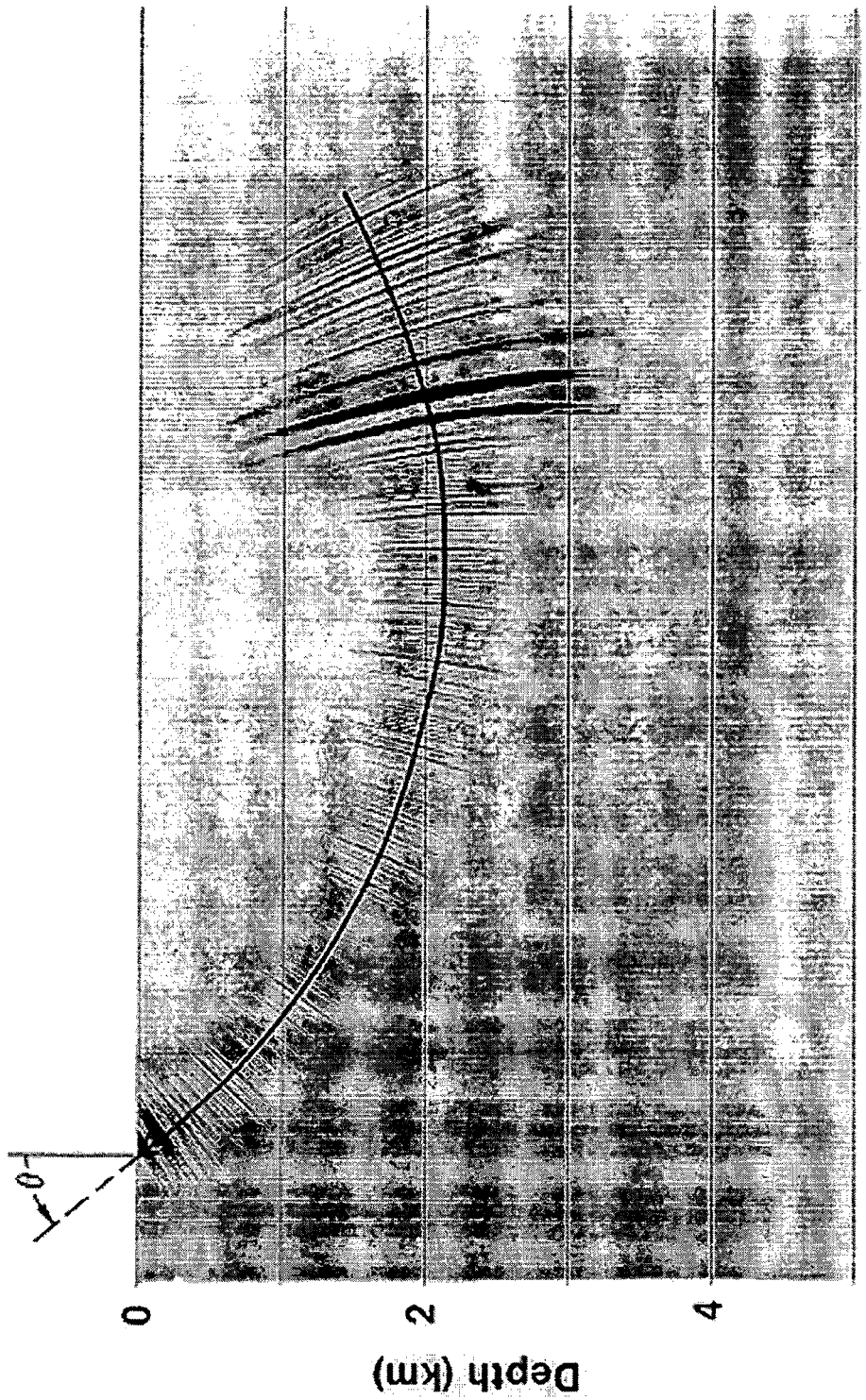
FIG. 6 depicts a single beam energy component, i.e., a Gaussian beam, which is projected into the earth along a ray path.

In the present preferred method (Hill, 2001), the transformation of the COS data sets into corresponding beam components is performed using the following mathematical expression:

$$D_h(L, p', \omega) = \left|\frac{\omega}{\omega_l}\right|^3 \int\int \frac{dx'dy'}{4\pi^2} D_h(r', \omega)\exp\left[i\omega p'\cdot(r'-L) - \left|\frac{\omega}{\omega_l}\right|\frac{|r'-L|^2}{2w_l^2}\right] \quad (1)$$

where $D_h(r',\omega)$ are the data recorded at vector offset h after being Fourier transformed into the frequency ($\omega$) domain, and where $w_l$ is the initial width of the beam at reference frequency $\omega_l$. The transformed data are $D_h(L, p', \omega)$, where vectors L and p' are the surface locations and directions of the beam components. Transform Equation (1) is similar to a windowed Fourier transform and to a Gabor transform. Each of the beam components is the component of the seismic energy that travels through the earth approximately along a particular ray path. FIG. 6 shows an example of one beam component projected into the earth. In this instance, the offset happens to be zero.

A provisional earth model is constructed in step 130 which is representative of a subterranean region which contains or is prospective for hydrocarbons. For example, the preferred earth modeling program may be the GOCAD™ software which was discussed above.

The earth model is made of many cells, perhaps even hundreds of thousands or millions of cells. The velocity properties of the cells in the earth model affect the direction of seismic energy propagation. Accordingly, for the purposes of this specification and claims, these cells shall be referred to as "lens elements" as these cells direct energy similar to the manner in which an optical lens directs light. That is, the lens elements refract energy passing there through. The refractions of energy through the lens elements are dependent upon the propagation properties of the individual lens elements comprising the earth model. More particularly, these propagation properties may include, but are not limited to, the geometric shape, the velocity field, including anisotropic specification of the velocity field, and the compressional and shear velocities.

A migrated seismic image is generated in step 140 utilizing the earth model and the energy components, i.e., Gaussian beam components, in this exemplary embodiment. More particularly, the set of beam components are ideally propagated through the lens elements using Gaussian beam migration to form image components which are combined or summed to form a seismic image. This Gaussian beam migration is preferably carried out as described in Hill, N. R., *Prestack Gaussian Beam Migration*, Geophysics, Volume 66, pp. 1240-50 (2001). Although not as preferred, the migration could also be performed in accordance with the method described in U.S. Pat. No. 5,274,605, entitled "Depth Migration Method Using Gaussian Beams", which has previously been mentioned above. For a zero-offset case, the method described in Hill, N. R., *Gaussian Beam Migration*, Geophysics, Volume 55, pp. 1416-28, (1990) can also be used. Appendices A and B describe, respectively, theory behind Gaussian Beams and the representation of a point source by Gaussian beam summation.

Figure 7:
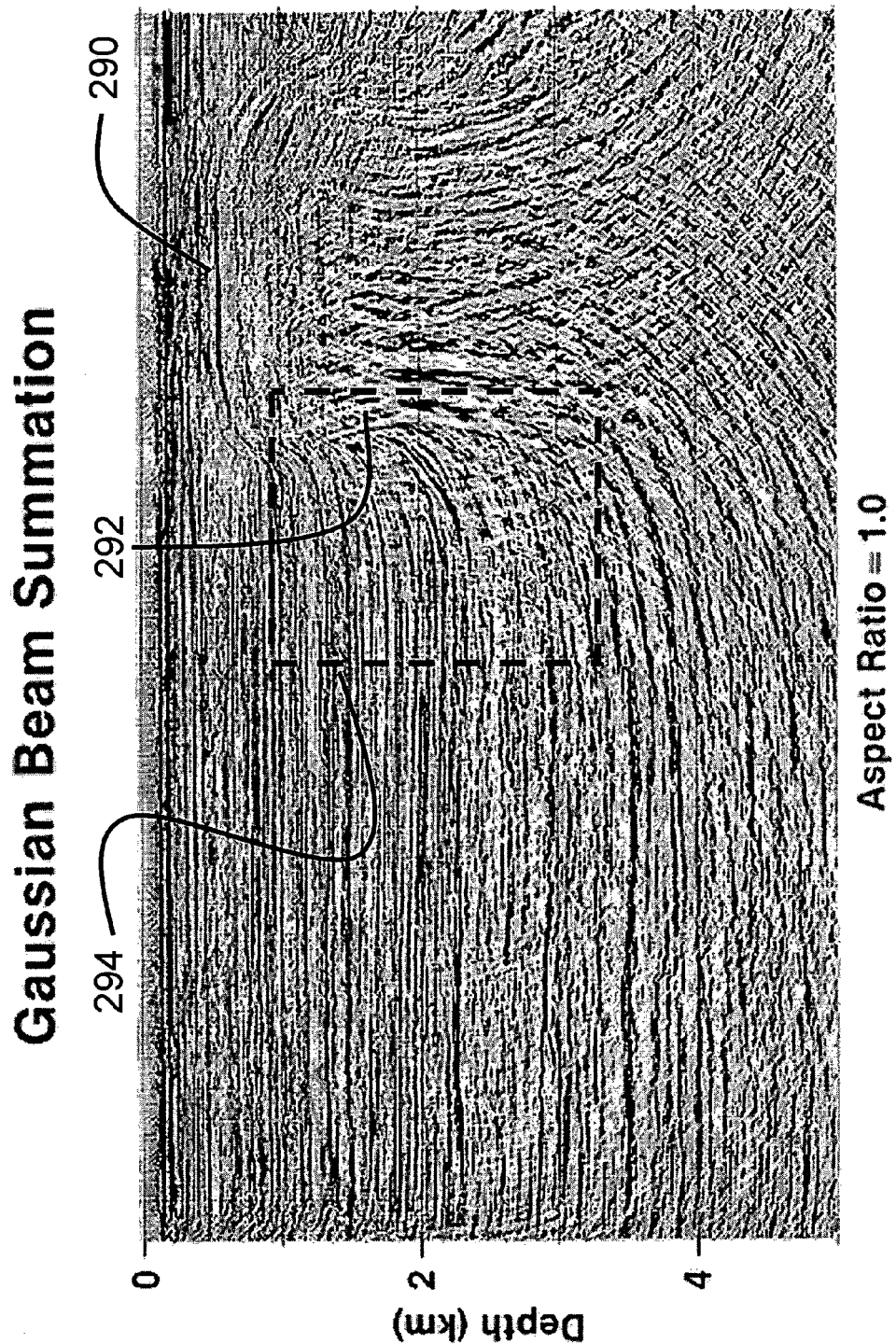
FIG. 7 illustrates a seismic image of a subterranean salt dome which is comprised of summed image components.

FIG. 6 shows a beam component after energy has been projected into the earth and the energy is received back along coincident ray paths. The vertical axis displays depth in kilometers and horizontal axis is horizontal position. The angle $\ominus$ is representative of the angle of departure and arrival for the beam component. The seismic image of the subsurface is obtained by projecting all beam components along their respective ray paths and summing their contributions to the image in the manner described in Hill (2001). The resulting seismic image, as shown in FIG. 7, displays a subterranean salt dome 290. The single beam component depicted in FIG. 6 contributes to the seismic image of the steep flank 292 of the dome. The salt dome flank 292 is contained within the rectangular box 294 of FIG. 7.

The most preferred Gaussian beam migration uses the up-down imaging principle described in Claerbout, J. F., *Coarse Grid Calculations of Waves in Inhomogeneous Media with Applications to Delineation of Complicated Seismic Structures*: Geophysics, 35, 407-418 (1970) and Claerbout, J. F., *Fundamentals of Geophysical Data Processing*: McGraw-Hill, (1976). The up-down imaging principle states that an image is formed by cross-correlating the downward-continued, recorded wavefield and the forward-modeled source wavefield. In the Fourier domain, this cross correlation of the two wavefields corresponds to summing over frequency the product of the downward-continued wavefield and the complex conjugate of the source wavefield. The boundary-value integral:

$$\phi(r, \omega) = \frac{-1}{2\pi}\int\int dx'dy' \frac{\partial G^*(r, r', \omega)}{\partial z'} \phi(r', \omega) \quad (2)$$

provides the downward-continued recorded wavefield, where r'=(x', y', 0) is the detector positions at the earth's surface z'=0. A Green's function $G(r,r',\omega)$ is the response at point r to a source at point r'. Gaussian beams enter the current derivation by expressing a Green's function as a Gaussian-beam summation. Appendices A and B show that a high-frequency representation of the field at point r caused by source at point r' is:

$$G(r, r'; \omega) \approx \frac{i\omega}{2\pi}\int\int \frac{dp'_x dp'_y}{p'_z} u_{GB}(r; r', p'; \omega) \quad (3)$$

where $u_{GB}(r;r', p';\omega)$ is the normalized beam (A.9) with initial conditions (A.10) and (A.11). The ray path for beam $u_{GB}(r; r',p';\omega)$ radiates from point r' with ray vector p'.

Green's function Equation (3) requires that the source point coincides with the initial point of the rays. Since seismic reflection surveys have closely spaced sources and detectors, however, Equation (3) should be modified so that the source point r' can be different from the initial point of the rays $r_0$. A simple way to do this modification is to insert a factor in the integrand of Equation (3) to compensate for the phase change from points $r_0$ to r':

$$G(r, r'; \omega) \approx \frac{i\omega}{2\pi}\int\int \frac{dp'_x dp'_y}{p'_z} u_{GB}(r; r_0, p'; \omega)\cdot\exp[-i\omega p'\cdot(r'-r_0)] \quad (4)$$

Equation (4) is valid for source points r' in some neighborhood of the ray initial point $r_0$. Since an additional phase factor has been introduced into the integrand, the saddle-point integration in Appendix B should also include the additional phase factor. These modifications, however, do not result in large corrections and make little difference in migrated images. This derivation proceeds by using the simple approximation in Equation (4).

Summing contributions from all sources results in the image:

$$I(r) = \frac{-1}{2\pi} \int d\omega \int\int dx_d dy_d \int\int dx_s dy_s \frac{\partial G^*(r, r_d; \omega)}{\partial z_d} G^*(r, r_s; \omega) D(r_d, r_s, \omega) \quad (5)$$

Function $D(r_d, r_s, \omega)$ is the field recorded by a detector at point $r_d=(x_d, y_d, 0)$ when the source is located at $r_s=(x_s, y_s, 0)$.

Instead of summing directly over source and detector positions, as in Equation (5), the present formulation emphasizes the application of the imaging operation to common-offset sections. Accordingly, the integration variables are changed to midpoint $r_m$ and offset h coordinates:

$$r_m = \frac{1}{2}(r_d + r_s) \quad (6)$$

$$h = \frac{1}{2}(r_d - r_s)$$

Equation (5) becomes:

$$I(r) = \int\int dh_x dh_y I_h(r) \quad (7)$$

$$I_h(r) = \frac{-2}{\pi} \int d\omega \int\int dx_m dy_m D_h(r_m, \omega) \frac{\partial G^*(r, r_d; \omega)}{\partial z_d} G^*(r, r_s; \omega) \quad (8)$$

where $D_h(r_m, \omega)$ is the field recorded at midpoint $r_m$ and offset h. The summation Equation (8) is the seismic image from data collected at the common-offset specified by the offset vector h. The integral Equation (7) sums the results of common-offset migrations (8) into a final image.

To use the Green's function representation of Equation (4) in integral Equation (8), the integrand must be partitioned. This partitioning is accomplished by inserting into the integrand of Equation (8) overlapping Gaussian functions that sum approximately to unity for any x and y:

$$\frac{\sqrt{3}}{4\pi} \left|\frac{\omega}{\omega l}\right| \left(\frac{a}{\omega l}\right)^2 \sum_L \exp\left[-\left|\frac{\omega}{\omega l}\right| \frac{|r'-L|^2}{2w_l^2}\right] \approx 1 \quad (9)$$

Vector $L=(L_x, L_y, 0)$ ranges over a two-dimensional lattice of points that spans the range of the recorded seismic data. The Gaussian width $w_l$ is the same as the initial beam width (see Appendix A). Constant a is the distance between nearest-neighbor lattice points. The normalization factor in Equation (9) is appropriate for a hexagonal lattice, which optimizes the approximation. Within each partitioned region, the ray origins for $G(r, r_d; \omega)$ and $G(r, r_s; \omega)$ are chosen to be at $r_0=L+h$ and $r_0=L-h$ (see FIG. 8B). These steps result in:

$$I_h(r) \approx \frac{2i\omega}{\pi} C_0 \int d\omega \int\int dp_x^d dp_y^d \int\int \frac{dp_x^s dp_y^s}{p_z^s} u_{GB}^*(r; L+h, p^d; \omega) u_{GB}^*(r; L-h, p^s; \omega) D_h(L, p^d + p^s, \omega) \quad (10)$$

Equation (10) becomes more manageable if the integration variables are changed to new variables $p^m=(p_x^m, p_y^m)$ and $p^h=(p_x^h, p_y^h)$, such that:

$$p_x^m = p_x^d + p_x^s$$

$$p_y^m = p_y^d + p_y^s$$

$$p_x^h = p_x^d - p_x^s$$

$$p_y^h = p_y^d - p_y^s \quad (11)$$

The new variables correspond to the time dip in common offset and common midpoint gathers. With these variable changes, Equation (10) becomes:

$$I_h(r) \approx -C_0 \sum_L \int d\omega \int\int dp_x^m dp_y^m U_h(r; L, p^m; \omega) D_h(L, p^m, \omega) \quad (12)$$

where $D_h(L, p^m, \omega)$ is the transformation Equation (1) for data of offset h, and $$U_h(r; L, p^m; \omega) = \frac{-i\omega}{2\pi} \int\int \frac{dp_x^h dp_y^h}{p_z^s} \quad (13)$$

$$u_{GB}^*(r; L+h, p^d; \omega)$$

$$u_{GB}^*(r; L-h, p^s; \omega)$$

describes the propagation of wavefield component $D_h(L, p^m, \omega)$. The sum and difference of the two-dimensional vectors $p^m$ and $p^h$ determine the initial directions $p^d$ and $p^s$ of the beam components in the integrand of Equation (13).

Figure 8:
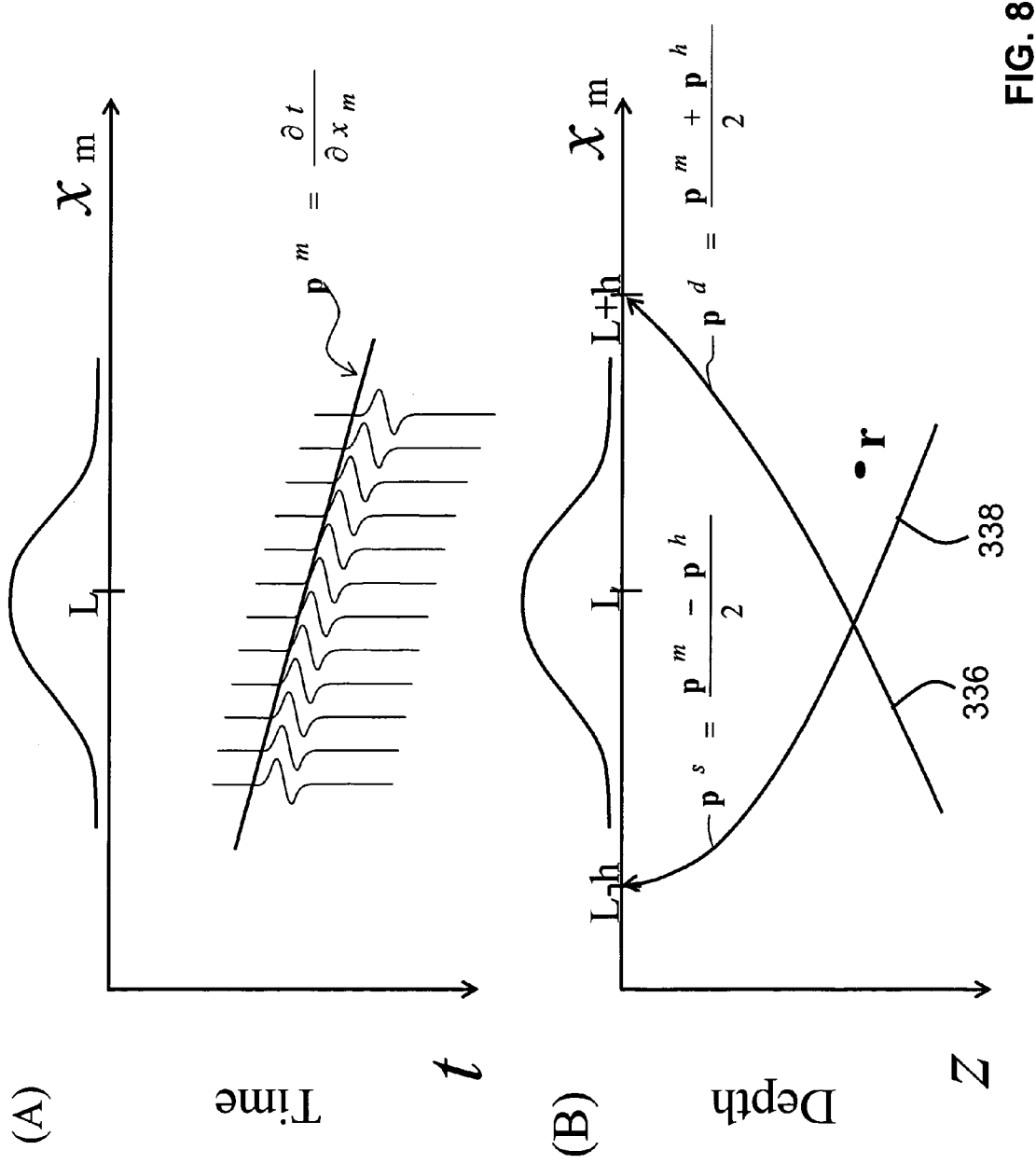
FIG. 8 Illustrates the transformation of seismic data into beam components showing (A) a transform separating events near location L having dip $p'''$; and (B) these events being projected back into the earth along all shot-detector ray path pairs that have dips summing to $p'''$.

The propagation described by Equation (13) includes all pairs of ray paths from the source and detector such that their dips are in accord with Equation (11). As depicted in FIGS. 8A and 8B, the dips of the shot ray and the detector ray must sum to $p^m$, which is equal to the dip of the data component $D_h(L, p^m, \omega)$.

Efficient evaluation of summation Equation (13) is important to pre-stack Gaussian beam migration. This summation over the product of source and detector beams does not depend on the recorded data, suggesting that travel time description is the essential role of Equation (13). Large contributions to the summation occur if both the beams pass near the point r for the same value of $p^h$ (see FIG. 8B). In general, the ray paths of both beams will not pass through r at the same value of $p^h$. Contributions to the summation Equation (13) could be evaluated by the method of steepest descents. Equation (13) may be written as:

$$U_h(r; L, p^m; \omega) = \frac{-i\omega}{2\pi} \int\int \frac{dp_x^h dp_y^h}{p_z^s} \quad (14)$$

$$A(r; p^m, p^h)$$

$$\exp[i\omega T(r; p^m, p^h)]$$

by using (A9). Function $A(r; p^m, p^h)$ is the product of amplitudes of the two beams; $T(r; p^m, p^h)$ is the sum of the complex travel times:

$$T(r; p^m, p^h) = T_d(r; p^d) + T_s(r; p^s) \quad (15)$$

where $T_d(r;p^d)$ and $T_s(r;p^s)$ are the complex travel times for the beams coming from detector and source points $r_d$ and $r_s$ with initial ray-vectors $p^d$ and $p^s$. Steepest-descents evaluation would result in:

$$U_h(r;L,p^m;\omega) \approx A_0 \exp[i\omega T_0] \qquad (16)$$

where $T_0$ is the complex travel time Equation (15) evaluated at the saddle point and $A_0$ is a complex amplitude. The amplitude $A_0$ does not depend on frequency because the steepest-descents evaluation of the two-dimensional integral generates a factor $\omega^{-1}$ that cancels the factor $\omega$ appearing in Equation (14). A steepest-descents evaluation of Equation (14) would determine $A_0$ from a second-order expansion of $T(r;p^m,p^h)$ about its saddle points. This expansion could be achieved by using the same dynamic-ray-tracing information used to construct the Gaussian beams. This added effort to determine $A_0$ is unwarranted in the present theory, however, because the imaging principle used is only kinematically correct.

The present goal of Gaussian beam migration is to form structurally correct images; the image amplitudes are secondary. For this limited goal, the following method provides a simple, fast evaluation of Equation (13). The first step is to assume that Equation (13) can be reduced to the form of Equation (16), which is tantamount to assuming the integral is dominated by contributions near an isolated saddle point. To further simplify the evaluation of Equation (13), the second step is to assume that the saddle point of $T(r;p^m,p^h)$ occurs at real $p^h$. In that case, the saddle point can be located by scanning all real values of $p^h$ for the value that minimizes the imaginary part of $T(r;p^m,p^h)$. The last step is to use the geometric average of the amplitude of the two beams for the value of $A_0$. An advantage of this $A_0$ is that the pre-stack and post-stack migrations will give similar results when applied to a zero-offset gather.

Of course, the complex time Equation (15) will not always have the isolated saddle points that are supposed by the approximation Equation (16). Approximation Equation (16) will not be valid in some cases where there are multi-valued travel times. Nevertheless, since Equation (11) restricts the domain of the travel times included in Equation (14), it also restricts multi-path contributions to this integral, although it does not eliminate these contributions. There is an advantage of searching for the minimum imaginary part of the travel time instead of the maximum real part. Although these two points will coincide at a saddle point, using the minimum imaginary part tends to select the most significant saddle point, when there are contributions from more than one.

Typically, the initial seismic image generated by the migration of step 140 will need iterative refinement. In step 150, one or more zones of interest or "targets" are identified in the seismic image which are to be enhanced by iterative refinement. A "target" shall mean a portion of the overall image selected for enhancement. Usually, the target will be a small sub-volume of the complete seismic image generated in step 140. For example, the target may be the indicated portion of the seismic image enclosed by rectangle 294 in FIG. 7. A particular target may be selected because that portion of the image is key to delineating a reservoir.

If the image is in some way deficient, then the earth model is evaluated and modified. Geologic and geophysical aspects of the image are concurrently examined. Parts of the image that are regarded by a geologist as deficient or questionable can be probed interactively for geologic and geophysical integrity by using techniques such as those illustrated by the following example.

Figure 9:
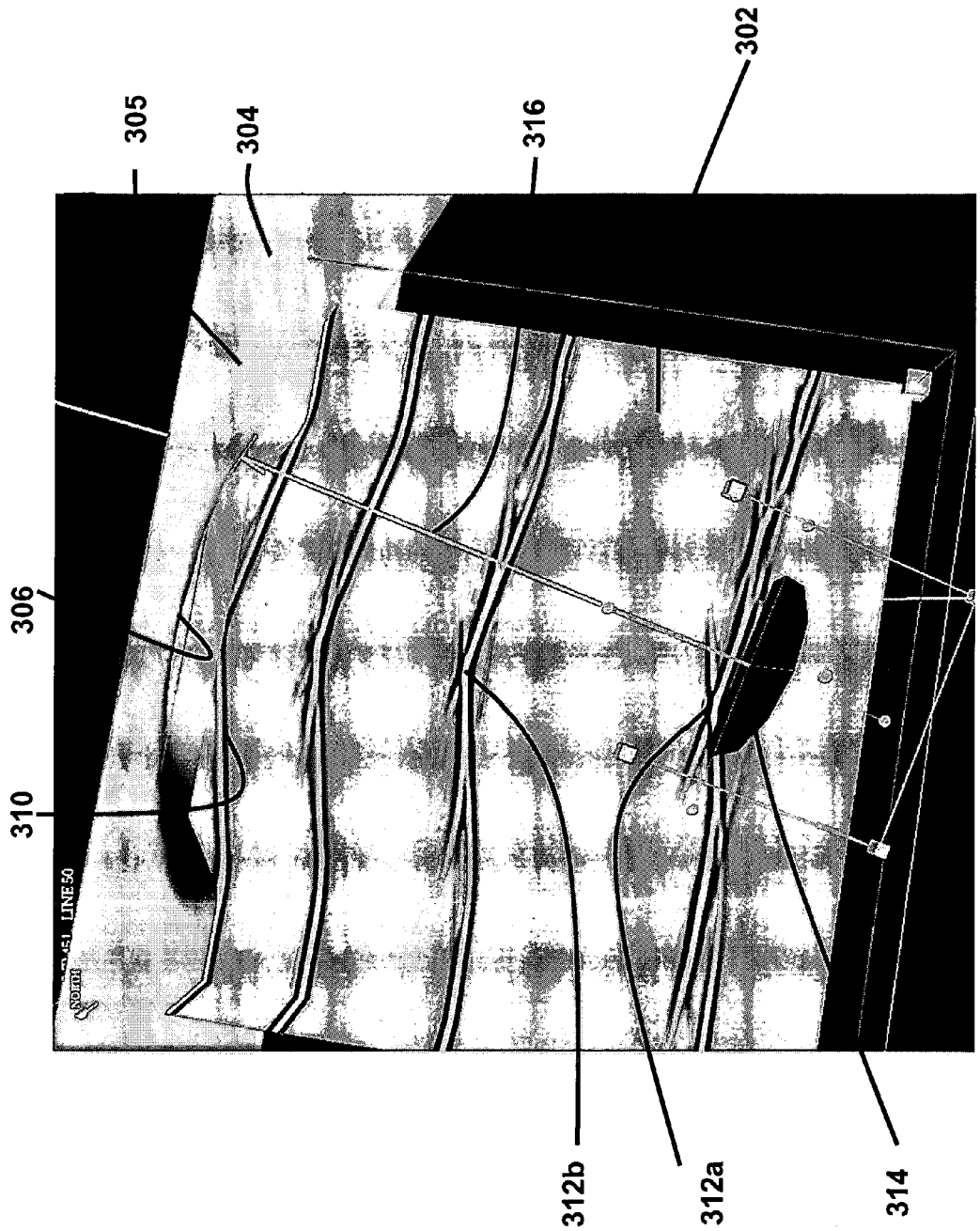
FIG. 9 shows a display used to analyze the problem of crossing reflectors in a seismic image.
Figure 10:
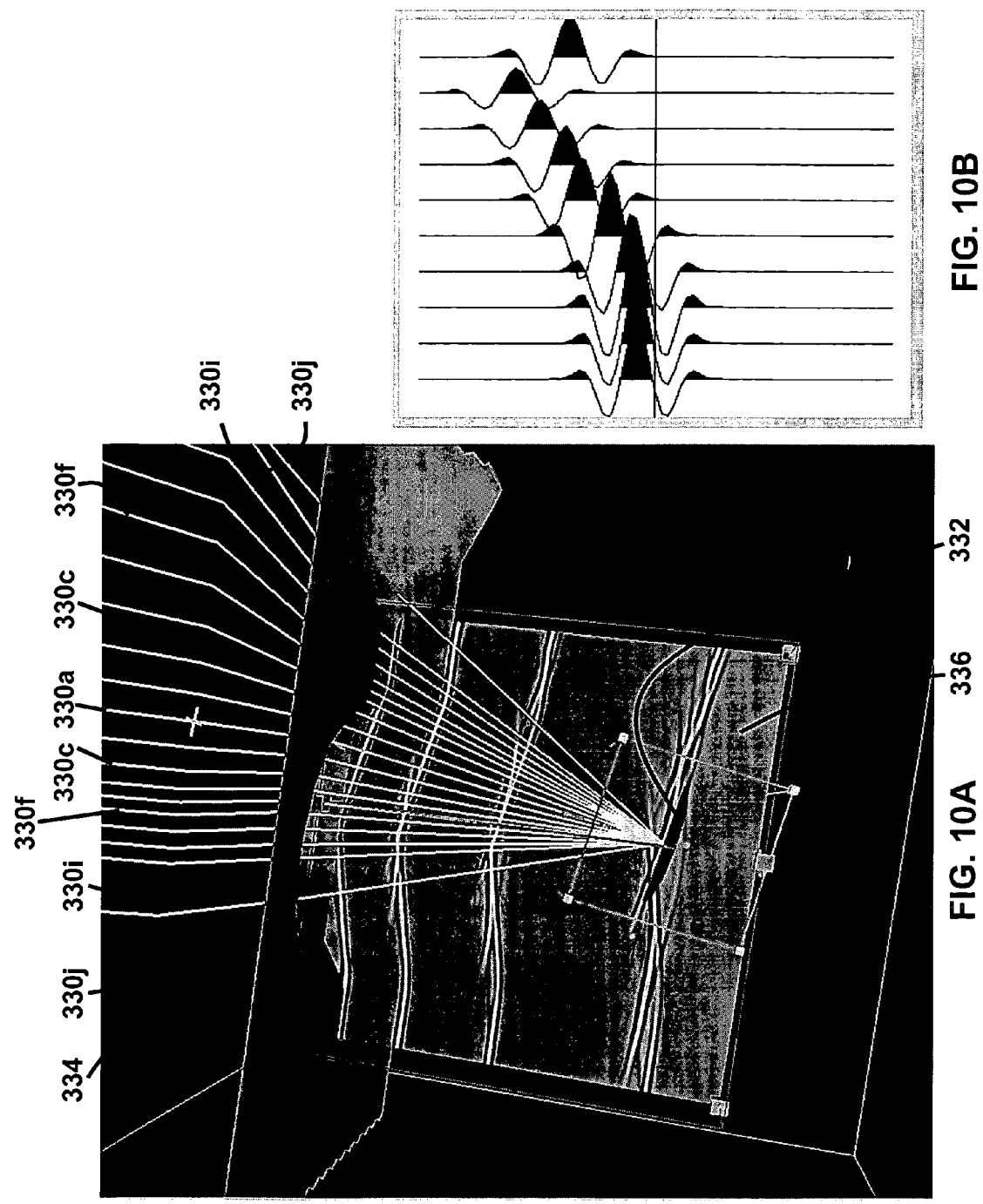
FIGS. 10A and 10B illustrate a focusing analysis using a two-point ray search of a faulty image wherein energy components have traveled along different ray paths and focus at different locations, indicating a problem with the earth model.

In step 160, an interpreter and a geophysicist who are ideally experienced in migration of seismic data then select a trial set of trial lens elements from the earth model. This trial set of lens elements is to be modified in an attempt to enhance the earth model and resulting seismic image. The trial set of lens elements are lens elements that might affect the imaging in the region of the target. Ray tracing techniques are preferably used to provide guidance in this selection process, as is illustrated in FIGS. 9 and 10, and will be described below. Also, FIG. 3 shows a flowchart describing these ray tracing techniques. Other methods for selection of the trial set of lens element to be updated may also be used. For example, the selection may be made by simple visual inspection.

FIG. 9 shows an image 302 superimposed over an earth model 304. Image 302 was formed by migrating synthetic seismic data and is superimposed in space over the earth model 304. Note that the surface 305 in earth model 304 contains a model anticline 306, i.e., an upwardly protruding "bump." Image 302 also shows an image anticline 310, although the model anticline 306 and image anticline 310 do not exactly match. For this synthetic data set, the surface 305 of the earth model 304 and the surface of image 302 should be flat; the erroneous anticline 310 in the image 302 is likely caused by the erroneous anticline 306 in the earth model 304.

There are several ways to test if the initial image 302 and the earth model 304 are correct. For example, image 302 is suspect because of crossing reflectors 312a and 312b at the boundaries of several layers. A suspect portion is identified by graphically positioning in step 161 (FIG. 3) a test disk 314 over a suspect portion of the earth model/image, i.e., one of the two crossing reflectors 312a. This disk 314 becomes a temporary reflecting surface in earth model 304. After a geophysicist interactively positions this reflecting disk 314 upon this feature in the image 302, a ray path 316 is traced in step 162 normally from the center of disk 314 through lens elements to a recording datum (not shown) of the earth model 304. The recording datum is the surface from which the seismic survey was recorded. This normal ray 316 describes the seismic data recorded at zero offset. For zero offset, most energy travels along coincident paths in the upward and downward directions. The path of the ray 316 extends through lens elements where there might be problems in the earth model 304 that are responsible for the erroneous image of crossing reflectors 312a and 312b. For example, the ray 316 in FIG. 9 intersects a portion of the anticline 306 in the model. If this anticline 306 is incorrect, it might be the cause of the faulty image 302. Accordingly, lens elements that are proximate normal ray 316 are selected in step 166 as a trial set of lens elements which are to be updated in the hopes of improving the image of the target.

A second geophysical test is shown in FIG. 10A. Again, a reflecting disk 332 is placed and adjusted in step 161 over a suspect portion of an earth model/image. The disk 332 is adjusted by using three-dimensional computer graphics to drag the disk into the desired location and orientation. Ideally, the disk is oriented sub-parallel to the bedding shown in the image or where bedding is anticipated to be in the image. In step 163, many different specular ray paths 330a-j are projected which reflect off reflecting disk 332. For each of these specular rays 330a-j, the angle of incidence to the disk surface 332 equals angle of reflection, as depicted in FIG. 10A. These reflected rays intercept spaced-apart locations on the recording datum. The intercept locations are compared against the actual locations of the sources and detectors used in the seismic survey of step 110.

A two-point ray trace search, which is well known to those skilled in the art of seismic ray theory, is performed in step 164 to match the intercept locations of these rays to the seismic survey geometry. The specular opening angles and azimuths are individually and iteratively adjusted at the specular reflection points until the ray source and detector intercepts are coincident with the actual locations of the survey sources and detectors. The display in FIG. 10A shows rays 330a-j determined by this search procedure for all the offsets utilized provided in step 110.

Once rays in FIG. 10A are determined, the image can be checked for misfocusing in step 165 by retrieving the energy which travels along each of these rays 330a-j. The energy traveling along each ray 330a-j will correspond to one of the energy components provided in step 120. To help explain this, FIGS. 8A and 8B show the relation between an exemplary pair of source rays 336 and detector rays 338 and their energy components, i.e., beam components in the preferred exemplary embodiment. The emerging angles of the detector and source rays 336, 338 define the ray vectors $p^d$ and $p^s$. As is illustrated in FIGS. 8A and 8B, energy traveling along this path will appear in a COS as events that slope at a rate $p_x^m = p_x^d + p_x^s$ in the x direction and $p_y^m = p_y^d + p_y^s$ in the y direction (see Equation 11). Moreover, energy propagation along this travel path will appear in a COS as events located near the midpoint coordinates $x_m = \frac{1}{2}(x_d + x_s)$, $y_m = \frac{1}{2}(y_d + y_s)$. The location $(x_m, y_m)$ and slope $(p_x^m, p_y^m)$ determine which beam data component contains the energy traveling along this ray path. In particular, the location and slope determine the arguments L and p' appearing on the left side of Equation (1). All ω samples for this (L, p') pair are retrieved from beamed data provided in step 110 and inverse Fourier transformed to the time domain. The beam components are often transformed to the time domain before storage, in which case the time samples are directly retrieved from a beam file. The location $(x_m, y_m)$ and slope $(p_x^m; p_y^m)$ will not, in general, fall exactly upon the sampled values of L and p' used when performing the transform computations prescribed by (1). The parameters L and p' are sampled as prescribed in Hill (2001) and are sufficiently dense for accurately interpolating values between samples. The time series of sampled values obtained by this retrieval will be referred to as a beam trace. This beam trace contains the waveform information of the energy that traveled along a ray path.

A beam trace is retrieved for each of the ray paths in FIG. 10A. Each beam trace is displayed to show how it contributes to the image near the disk. FIG. 10B shows a beamed trace for each ray path. A small window of each trace has been plotted after having been delayed in time by the travel time along each ray. If the earth model were exactly correct, there would be no shift in the reflection event from trace to trace because the ray-trace travel time would exactly be the arrival time of the reflected event. An event is a lineup on a number of traces of the arrival of new seismic energy, indicated by a systematic phase or amplitude change on a seismic record. In the case in FIG. 10B, however, there is a shift, indicating that the earth model is incorrect along the travel paths indicated in FIG. 10A. In particular, if the earth model were correct, then the travel-times computed by ray tracing would be larger at the larger offsets or less at the small offsets, or both. The incorrect focusing of the energy appearing in FIG. 10B causes degradation of the image in FIG. 10A because the contributions from the different ray paths do not add together constructively.

A geophysicist observes that the rays which illuminate a faulty part of the image pass through portions of the earth model that are suspect. For example, the ray paths in the synthetic data of FIGS. 9 and 10 pass through the bump or anticline 306 in the earth surface 322. The geologist and geophysicist analyzing the image might suspect that the bump is incorrect, perhaps because the mapping of this part of the image was ambiguous. The misfocusing observed in FIG. 10B is further evidence that some of the lens elements falling along the rays paths in FIG. 10A are incorrect and should be adjusted. Therefore, the lens elements that are intercepted by the rays shown in FIG. 10A may be selected in step 166 as candidates for the trial set of lens elements which is to be updated in hopes of improving the image in the region of the target.

Another consideration during the selection of trial lens elements is that some portions of the image and model might be more credible than others. For instance, some portions of the current earth model might be constrained by well data. Other portions of the earth model are subject to revision because those portions were constructed based upon a degraded or ambiguous seismic image.

Figure 11:
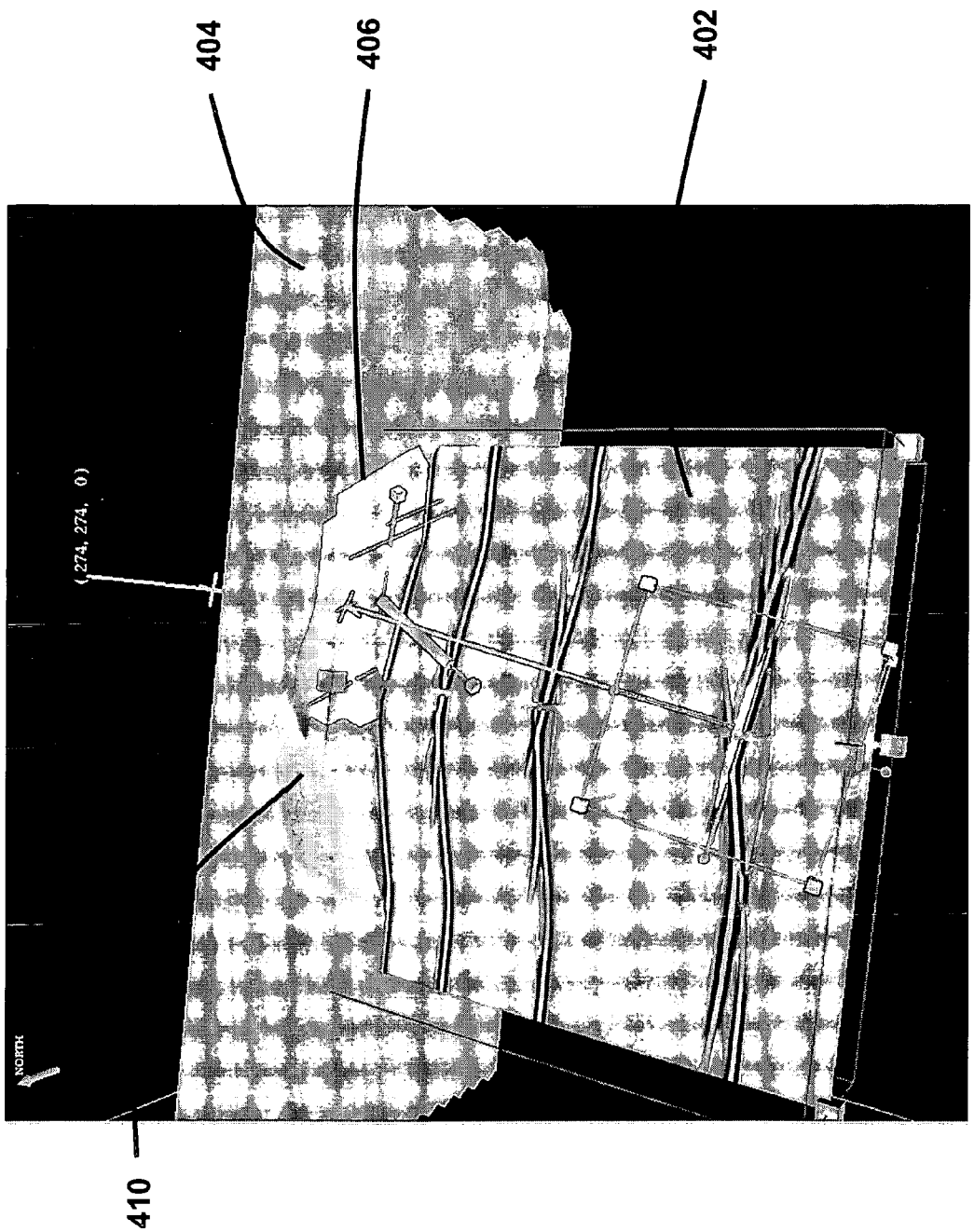
FIG. 11 shows lens elements of an earth model being modified with a portion of an earth surface being interactively dragged with the change in the focusing of the lens element being immediately updated.

FIG. 11 shows an example of an image 402 superimposed upon an earth model 404. A sub-volume of lens elements 406 is graphically selected as a trial set of lens elements which touch or are contained within this sub-volume. In this case, the lens elements 406 are comprised of the boundary shape of the highlighted surface region shown in FIG. 11. A bump 410 in the surface region is identified as the likely cause of misfocusing because bump 410 is geologically suspect and because rays passing through bump 410 are misfocused. This surface region is repositioned by using 3D computer graphics tools. The geologist and geophysicist modify the earth model by using 3D computer graphics to drag surfaces of the selected lens elements 406 into different positions to change the propagation properties, in particular the shapes, of these lens elements 406. Alternatively, the propagation properties of these lens elements could be modified or updated by changing the velocity field within this region. Or else, both the geometric shapes and the velocity fields could be updated.

The propagation properties of the selected subset of lens elements are then updated. These updates are largely trial and error but the trials are informed by the ray trace analysis described with respect to FIGS. 9 and 10. Ideally, a geophysicist/migration expert will collaborate with a geologist to determine how best to update the selected subset of lens elements. This collaboration should ideally result in changes to the lens elements which enhance the geophysical focus about the target(s) in the various seismic images and also produce seismic images which are geologically plausible. Examples of propagation properties which might be updated include the velocity field of the selected subset of lens elements and the shape of those lens elements. This shape can be updated geographically by moving surfaces of the suspect lens elements. Other properties which may be changed in an effort to enhance the seismic image may include, by way of example and not limitation, the anisotropic model specifications of the velocities.

Before actually updating the image, the geophysicist can quickly estimate the likely effects of the modifications to the earth model. By ray tracing through the modified model, the new position of the disk in FIG. 9 can be instantly determined by map migration. This repositioning of the disk is a good indication of the repositioning of the reflection events that will occur when the image is revised with the modified model. Furthermore, the alignment of the reflection events in FIG. 10B also can be instantly updated according to the modified model by computing the change in travel time along the specular rays. Although FIGS. 9 and 10 show only one disk, many disks can exist at once in an image and corresponding model.

Preferably, only a subset of the original energy components computed in step 120 must be repropagated to form updated image components to be used in updating the image. FIG. 4 shows a flowchart describing a preferred method for selecting this subset of energy components. First a reduced, but preferably overly inclusive, trial set of energy components which may contribute to the image near the target is sought. Ray paths of those energy components computed in step 120 are checked to in step 171. Rays corresponding to each energy component are traced downward from the surface and only energy components having rays that pass within some predetermined distance from the target are candidates for this trial set of lens elements. This predetermined distance should be larger than the beam width to include beams that may move into or out of the targeted image because of updates to the propagation properties of the lens elements. A second check is to see whether the ray paths pass through at least one of the updated lens elements. Energy components whose ray paths meet both of these criteria are then selected for inclusion in the trial set of lens elements.

In step 172, ray paths are traced through the updated earth model for each of the trial set of energy components. The step recomputing updated image components, which is computationally intensive, need not be incurred at this time. To further reduce the number of energy components which must be used to compute updated image components, the updated ray paths of the trial set of energy components are analyzed in step 173. First, the ray paths must have beams that touch the target. Second, the ray paths must also pass through at least one of the updated lens elements. Those energy components which have updated ray paths meeting these two criteria are then included for inclusion in the subset of energy components used to compute updated image components.

Those skilled in the art will appreciate that other criteria could be used to reduce the number of energy components which are to be used to form update image components. By way of example, and not limitation, only energy components which pass within the predetermined distance of the target might be selected and the other selection criteria ignored. Again, those skilled in the art will appreciate that other methods of choosing the subset of energy components can be used and are within the scope of this invention.

In step 180, the subset of energy components, or beam components in the preferred embodiment, is propagated through the updated earth model to form updated image components. The ray paths of these beam components will be changed due to the change in propagation properties of the updated lens elements. Similarly, the updated image components will also be revised. The seismic images are updated in step 190. Only the image components belonging to the subset of energy components identified in step 170 are updated in an image data file computed in step 140. Each of these image components computed according to the previous earth model is replaced with one computed according to the current earth model. That is, the image components associated with the old energy components are subtracted from the image and the image components associated with the new energy components are added.

Although it is not essential for the current invention, the computer time required for step 170 can be reduced by using limited aperture methods, which are in some ways similar to methods described by Carroll, R. J. et. al, *A Directed-Aperture Kirchhoff Migration*, et al., in Geophysical Imaging, Symposium of Geophysical Society of Tulsa; Tulsa SEG, pp. 151-165 and by Krebs, J. R. in U.S. Pat. No. 5,640,368, entitled "Migration Velocity Analysis Using Limited-Aperture and Monte Carlo Migration". For example, the ray tracing computations in step 170 can be reduced by only testing beam ray paths that are in the neighborhood of rays reflecting from one of the disks used in step 160 (see FIG. 10A).

This neighborhood is determined as follows. Test rays of step 170 must depart from the earth's surface within some predetermined spatial distance from one of the rays reflecting from one of the disks. Also, the direction of the departing test ray must be within some predetermined angular distance from one of the rays reflecting from one of the disks. Limiting the ray tracing in this way is similar to the limited aperture methods named above in that the chosen subset of input data used in the migration is based upon interpretively identifying reflection events within the seismic data. The current method, however, limits the input data not only to components falling within some small spatial aperture identified by ray tracing, but also to beam components that propagate in directions also identified by ray tracing. Moreover, the alternative methods named above compute the image solely from data components within the limited spatial aperture. In contrast, the current method updates an existing image by replacing data components within some limited spatial and angular aperture.

In step 200, the earth model and the seismic image are then evaluated to determine if they are satisfactory or not. Factors as previously discussed are evaluated including: (1) whether the earth model is consistent with the seismic image; (2) whether the seismic image is geologically plausible or even possible; and (3) whether the image is well-focused or is blurred.

If the image quality is judged by the interpreter as sufficient for accurately delineating the subterranean geology, the current image is used for mapping prospects, planning wells, estimating reserves and for other technical and business decisions. If not, the iteration of steps 150-190 are repeated until a satisfactory seismic image and earth model are created.

Figure 1:
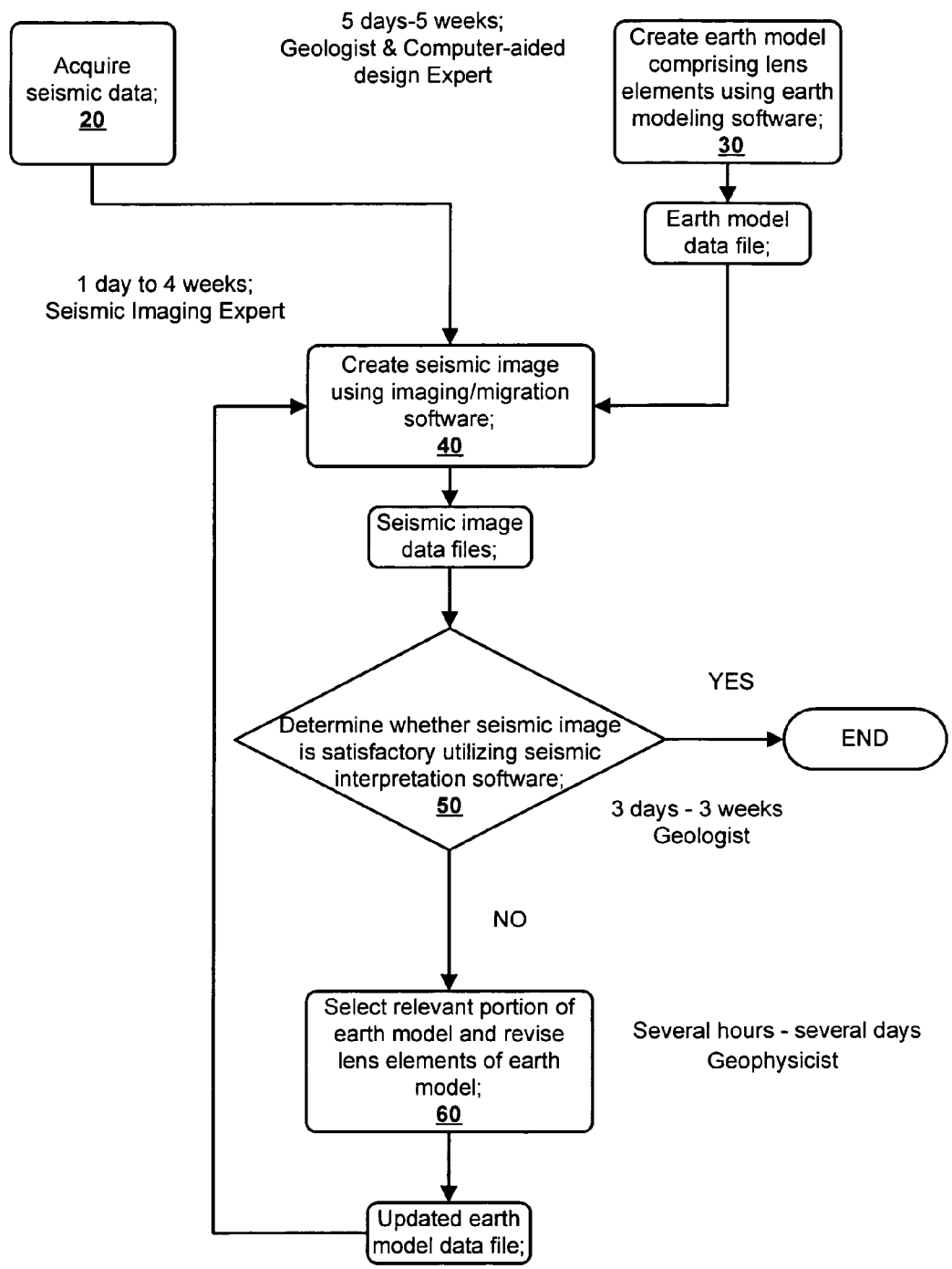
FIG. 1 is a flowchart showing steps conventionally used in iteratively enhancing seismic images and earth models.

The present invention overcomes many of the shortcomings in conventional iterative methods of constructing earth models and seismic images. First, the invention greatly reduces computation time by ideally incrementally updating only the portions of the seismic image that are affected by the latest earth model updates. Second, the invention preferably integrates software (earth modeling, seismic imaging and seismic interpretation) corresponding to the steps 30-50 in FIG. 1 into a single software application. This helps eliminate problems associated with the repeated transfer of data files between discrete software packages. This integrated application ideally links three-dimensional desk-top graphics with high performance computer engines so that the cycle time for revision of the earth model and seismic image often takes less than an hour.

Beam migration methods promote quick turnaround through incremental updates. This quick turnaround and the integrated software fosters collaboration between geologic and geophysical experts during the iterative updating of the seismic image and earth model.

Geologic insights guide trial-and-error corrections to an earth model and seismic image. The trial modifications of the earth model, however, can be informed not only by structural patterns emerging in the image but also by quick ray-trace analysis of imaging focusing. Detailed analysis is promoted because energy is analyzed into components that travel along ray paths. This analysis can include locating problems in the earth model, point and click velocity measurements, and quick identification of coherent events that are not primary compression waves.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

Appendix A

Gaussian Beams

This appendix summarizes three-dimensional Gaussian beams and presents a simple beam parameterization that is used for the migration method used in this specification. A full description of Gaussian beams in the context of dynamic ray theory appears in a review by Cerveny, V., *The application of ray tracing to the propagation of shear waves in complex media*, in Dohr, G. P. Ed. Handbook of Geophysical Exploration: Seismic shear waves: Geophysical Press, pp. 1-240 (1985). Another publication describing ray tracing is Cerveny, V., *Seismic Ray Theory*, Cambridge University Press (2000).

In the neighborhood of a ray path, the expansion of the travel time field to second order in ray-centered coordinates is:

$$T(q_1, q_2, s) \approx \tau(s) + \frac{1}{2} q^T M(s) q \tag{A.1}$$

where s is arc length along the ray and $q_1$ and $q_2$ are coordinates along the axes $\hat{e}_1$ and $\hat{e}_2$ that lie in a plane perpendicular to the ray at point s (see Cerveny, 1985). The axes $\hat{e}_1$ and $\hat{e}_2$ are constructed such that the coordinates $(q_1, q_2, s)$ form a right-handed, orthogonal, curvilinear system. Function $\tau(s)$ is travel time along the ray path:

$$\tau(s) = T(0,0,s) \tag{A.2}$$

Vector q is a two-dimensional vector, $$q^T = (q_1, q_2) \tag{A.3}$$

The elements of the 2×2 matrix M(s) are the second derivative of the travel time field with respect to the coordinates $q_1$ and $q_2$:

$$M_{IJ}(s) = \left[ \frac{\partial^2 T(q_1, q_2, s)}{\partial q_I \partial q_J} \right]_{q_1 = q_2 = 0} \tag{A.4}$$

Expansion (A.1) contains no first order derivatives because, for the isotropic case considered in this paper, constant travel time surfaces are perpendicular to rays.

A way to determine the matrix M(s) is to substitute (A.1) into the eikonal equation written in ray-centered coordinates. This step yields a non-linear, ordinary differential equation for M(s). The standard procedure of dynamic ray tracing is to reduce this equation to the linear system:

$$\frac{dQ(s)}{ds} = v(s) P(s) \tag{A.5}$$

$$\frac{dP(s)}{ds} = -v^{-2}(s) V(s) Q(s) \tag{A.6}$$

where P(s) and Q(s) are 2×2 matrices such that:

$$M(s) = P(s) Q^{-1}(s) \tag{A.7}$$

Matrix V(s) is a 2×2 matrix of second derivative of the velocity field:

$$V_{IJ} = \frac{\partial^2 v}{\partial q_I \partial q_J} \tag{A.8}$$

Since the travel time field (A.1) satisfies the eikonal equation in the vicinity of the ray path, the transport equation can then be invoked to determine the amplitudes of a high-frequency solution to the scalar wave equation (1). The resulting solution is:

$$\sqrt{\frac{v(s) \det Q(s_0)}{v(s_0) \det Q(s)}} \exp\left\{ i\omega \left[ \tau(s) + \frac{1}{2} q^T M(s) q \right] \right\} \tag{A.9}$$

normalized to unity at $s = s_0$.

The character of solution (A.9) is determined by the initial conditions chosen for matrix functions P and Q. For any choice of real P and Q, there might be points along the ray path where solution (A.9) fails because det Q=0. On the other hand, complex initial values of P and Q can be chosen so that (A.9) is always a bounded, high frequency solution of the scalar wave equation. If choice of complex initial values is such that $\text{Im}\{PQ^{-1}\}$ is positive definite and det Q≠0, then these qualities hold everywhere along the ray path. In this case, (A.9) is the well-known Gaussian-beam asymptotic solution to the wave equation (Cerveny, 1985). The particular initial-value choice:

$$P_0 = \begin{pmatrix} i/V_0 & 0 \\ 0 & i/V_0 \end{pmatrix} \tag{A.10}$$

$$Q_0 = \begin{pmatrix} \omega_l w_l^2 / V_0 & 0 \\ 0 & \omega_l w_l^2 / V_0 \end{pmatrix} \tag{A.11}$$

results in a beam with initial width $w_l$ at frequency $\omega_l$. Quantity $V_0$ is the seismic velocity at the ray's initial point $s_0$.

Appendix B

Representation of A Point Source by Gaussian Beam Summation

The field from a point source at r' is approximated by the Gaussian beam $$G(r, r'; \omega) = \int d\Omega \Psi(\Omega) u_{GB}(r, r', \Omega; \omega) \tag{B.1}$$

where function $u_{GB}$ is the value at point r of a Gaussian beam that departs from point r' at angle $\Omega = (\theta, \phi)$, and $d\Omega$ is the solid angle $\sin\theta \cdot d\theta d\phi$. The spherical coordinates are such that point r' is at the origin and point r is on the axis $\theta = 0$. Function $\Psi(\Omega)$ must be determined. If the velocity field is constant $v(r) = V_0$, then by symmetry, this function is constant, $\Psi(\Omega)=\Psi_0$. This constant $\Psi_0$ will also be appropriate if the actual medium is nearly constant for a few wavelengths about the source, but is more complicated elsewhere.

In a constant velocity medium, the Gaussian beam given by Equations (A.9) to (A.11) simplifies to:

$$u_{GB} = \frac{\omega_l w_l^2}{V_0}\left(\frac{\omega_l w_l^2}{V_0} + is\right)^{-1} \exp\left\{i\omega\left[\frac{s}{V_0} + \frac{i}{2}\frac{q_1^2 + q_2^2}{\omega_l w_l^2 + iV_0 s}\right]\right\} \quad (B.2)$$

Then equation (B.1) becomes:

$$G = \Psi_0 \int_0^{2\pi} d\phi \int_0^\pi \sin\theta \cdot \quad (B.3)$$
$$d\theta \frac{\omega_l w_l^2}{\omega_l w_l^2 + iV_0 R\cos\theta} \exp\left\{i\omega\left[\frac{R\cos\theta}{V_0} + \frac{i}{2}\frac{R^2 \sin^2\theta}{\omega_l w_l^2 + iV_0 R\cos\theta}\right]\right\}$$

where $R=|r-r'|$. A stationary point of the integral occurs at $\theta=0$. Since for large $\omega$, the principal contribution to the integral occur near this stationary point, (B.3) can be approximated as:

$$G = 2\pi\Psi_0\left(\frac{\omega_l w_l^2}{\omega_l w_l^2 + iV_0 R}\right)\exp(i\omega R/V_0) \cdot \quad (B.5)$$
$$\int_0^\infty \theta \exp\left\{\frac{-i\omega}{2}\frac{R}{V_0}\left[\frac{\omega_l w_l^2}{\omega_l w_l^2 + iV_0 R}\right]\theta^2\right\}d\theta$$

Evaluation of the definite integral results in:

$$G = \Psi_0\left(\frac{-2\pi i V_0}{\omega}\right)\frac{\exp(i\omega R/V_0)}{R} \quad (B.6)$$

Equation (B.6) is the well-known response for a constant velocity if:

$$\Psi_0 = \frac{i\omega}{2\pi V_0} \quad (B.7)$$

For the present derivation, it is more convenient to change integration variables from $\theta$ and $\phi$ to ray-parameters $p'_x$ and $p'_y$:

$$p'_x = \frac{1}{V_0}\sin\theta\cos\phi \quad (B.8)$$
$$p'_y = \frac{1}{V_0}\sin\theta\sin\phi$$
$$p'_z = \frac{1}{V_0}\cos\theta$$

With these variable changes and (B.7), the Green's function (B.1) becomes:

$$G(r, r'; \omega) = \frac{i\omega}{2\pi}\int \frac{dp'_x dp'_y}{p'_z} u_{GB}(r; r', p'; \omega) \quad (B.9)$$

What is claimed is:

1. A method for creating an enhanced depth-migrated seismic image, the method comprising:
   a) acquiring seismic data from a seismic survey conducted over a subterranean region;
   b) transforming the seismic data into a set of energy components;
   c) creating an earth model having velocity model characterizations therewithin representative of the subterranean region, the earth model comprising a set of lens elements having propagation properties which affect energy propagation through the lens elements;
   d) propagating the set of energy components through the lens elements to form image components which are combined into a depth-migrated seismic image;
   e) identifying a target in the seismic image for image enhancement;
   f) selecting a trial subset of less than all of the lens elements from the set of lens elements and updating propagation properties of the trial subset of lens elements which may affect imaging of the target without updating the propagation properties of all of the lens elements of the earth model;
   g) selecting a trial subset of less than all of the energy components from the set of energy components which may affect imaging of the target;
   h) propagating the trial subset, without propagating all, of the set of energy components through the earth model to form updated image components; and
   1) updating the seismic image by replacing image components of the current seismic image with the updated image components without replacing all of the image components to arrive at an enhanced seismic image.

2. The method of claim 1 wherein:
the energy components are beam components.

3. The method of claim 2 wherein:
the beam components are Gaussian beam components.

4. The method of claim I wherein:
the set of energy components includes any partitioning of the seismic data including shot profiles, common offset data, common midpoint data and plane wave energy components.

5. The method of claim 1 wherein:
the propagation of the energy components through the lens elements to form image components is computed using beam migration.

6. The method of claim 1 wherein:
the trial subset of lens elements is selected using ray tracing.

7. The method of claim 6 wherein:
the ray tracing utilizes a two-point ray trace search.

8. The method of claim 6 wherein:
the ray tracing utilizes normal ray tracing.

9. The method of claim 1 wherein:
the trial subset of lens elements is selected by visual inspection.

10. The method of claim 1 wherein:
the trial subset of energy components is selected using a directed-aperture.

11. The method of claim 1 wherein:
the trial subset of energy components is selected using a migration aperture.

12. The method of claim 1 wherein:
the trial subset of energy components is selected using ray tracing.

13. The method of claim 1 wherein:
the step of selecting a trial subset of energy components includes selecting a subset of energy components that have ray paths that pass within a predetermined distance of the target prior to updating of the lens elements.

14. The method of claim 1 wherein:
the step of selecting a trial subset of energy components includes selecting a subset of energy components each having a ray path that passes through at least one of the updated lens elements.

15. The method of claim 1 wherein:
the step of selecting a trial subset of energy components includes selecting a subset of energy components that each have a ray path that passes within a predetermined distance of the target and each ray path passes through at least one of the updated lens elements.

16. The method of claim 1 wherein:
the step of selecting a trial subset of energy components includes propagating the trial subset of energy components through the updated earth model to create updated ray paths for the trial subset of energy components.

17. The method of claim 16 wherein:
the trial subset of energy components is selected from the energy components which touch the target and have ray paths that pass through at least one of the updated lens elements.

18. The method of claim 1 wherein: the steps (e)-(i) are computed within a single interactive software application.

19. The method of claim 1 wherein:
steps (e)-(i) are repeated at least one more time.

20. The method of claim 1 wherein:
the earth model is a velocity model.

21. The method of claim 1 wherein step (d) further comprises:
generating the depth-migrated seismic image with depth migration software.

22. The method of claim 1 wherein step (d) further comprises:
generating the depth-migrated seismic image with depth-migration imaging software responsive to the earth model having velocity model characterizations therewithin.

23. The method of claim 20 wherein step (d) further comprises:
generating the depth-migrated seismic image with depth-migration imaging software responsive to the velocity model.

24. A method for enhancing a depth-migrated seismic image comprising:
a) propagating a set of seismic energy components through an earth model having velocity model characterizations therewithin comprising a set of lens elements to form a set of image components which are summed to form a depth-migrated seismic image;
b) identifying a target in the seismic image which is to be enhanced;
c) updating a trial subset of lens elements of less than all of the lens elements from the set of lens elements to update the earth model without updating all of the lens elements of the earth model;
d) selecting a trial subset of energy components of less than all of the energy components from the energy components of step (a);
e) propagating the trial subset of energy components through the updated earth model without propagating all of the set of energy components through the updated earth model to create updated image components; and
f) replacing current image components with the updated image components and not replacing those image components that were not updated to create an enhanced seismic image.

25. The method of claim 24 wherein:
the energy components are beam components.

26. A method for enhancing a depth-migrated seismic image comprising:
a) creating a depth-migrated seismic image using an earth model having velocity model characterizations therewithin comprising a set of lens elements and using seismic data, the seismic image comprising a set of image components, the seismic image including a target which is to be enhanced;
b) updating a trial subset of less than all of the lens elements selected from the set of lens elements in the earth model;
c) updating those image components in the seismic image which are associated with changes in the trial subset of lens elements of the earth model which affect the seismic imaging of the target; and
d) subtracting image components in the seismic image and adding in their place updated image components without replacing all of the image components to enhance the seismic image.

27. A method for enhancing a depth-migrated seismic image comprising:
a) propagating a set of seismic energy components through a velocity model, comprising a set of lens elements, to form a set of image components which are summed to form an original depth-migrated seismic image;
b) updating at least some of the lens elements to update the velocity model;
c) selecting a trial subset of energy components of less than all of the energy components from the set of energy components of step (a);
d) propagating the trial subset, without propagating all, of the energy components through the updated velocity model to create updated image components; and
e) subtracting image components from the original seismic image and adding in their place updated image components, without replacing all of the image components of the original seismic image, to arrive at an updated enhanced seismic image.

28. The method of claim 27 wherein:
less than of the all of the lens elements are updated in step b) to update the velocity model.

29. The method of claim 27 wherein:
the trial subset of lens elements is selected by visual inspection.

30. The method of claim 27 wherein:
the trial subset of energy components is selected using a directed-aperture.

31. The method of claim 27 wherein:
the trial subset of energy components is selected using a migration aperture.

32. The method of claim 27 wherein:
the updated image components of the enhanced seismic image replace corresponding image components from the original seismic image and image components for which no updated image components were created in step d) remain the same between the updated seismic image and the original seismic image.

33. The method of claim 27 wherein:
a target is selected in the current original seismic image which is to be enhanced.

34. The method of claim 33 wherein:
the step of selecting a trial subset of energy components of less than all of the energy components uses ray tracing to select energy components which may affect imaging of the target.

35. The method of claim 34 wherein:
the ray tracing uses a two-point ray trace search.

36. The method of claim 34 wherein:
the ray tracing utilizes normal ray tracing.

37. The method of claim 34 wherein:
the step of selecting a trial subset of energy components includes selecting energy components that have ray paths that pass within a predetermined distance of the target prior to updating of the lens elements.

38. The method of claim 34 wherein:
the step of selecting a trial subset of energy components includes selecting energy components each having a ray path that passes through at least one of the updated lens elements.

39. The method of claim 34 wherein:
the step of selecting a trial subset of energy components includes selecting energy components that each have a ray path that passes within a predetermined distance of the target and passes through at least one of the updated lens elements.

40. The method of claim 34 wherein:
the trial subset of energy components is selected from the energy components which have ray paths that touch the target and pass through at least one of the updated lens elements.

* * * * *